(12) United States Patent
Kozuka et al.

(10) Patent No.: US 9,031,746 B2
(45) Date of Patent: May 12, 2015

(54) VEHICLE CONTROL DEVICE

(71) Applicants: Tomoyuki Kozuka, Susono (JP); Takahiro Yokota, Susono (JP)

(72) Inventors: Tomoyuki Kozuka, Susono (JP); Takahiro Yokota, Susono (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 0 days.

(21) Appl. No.: 14/374,406

(22) PCT Filed: Jan. 9, 2013

(86) PCT No.: PCT/JP2013/050249
§ 371 (c)(1),
(2) Date: Jul. 24, 2014

(87) PCT Pub. No.: WO2013/111617
PCT Pub. Date: Aug. 1, 2013

(65) Prior Publication Data
US 2015/0006034 A1    Jan. 1, 2015

(30) Foreign Application Priority Data

Jan. 27, 2012   (JP) .................................. 2012-015117

(51) Int. Cl.
*B60W 30/045*      (2012.01)
*B60T 8/18*        (2006.01)
(Continued)

(52) U.S. Cl.
CPC ................ *B60W 30/045* (2013.01); *B60T 8/18* (2013.01); *B60T 2250/03* (2013.01);
(Continued)

(58) Field of Classification Search
CPC ....... B60T 8/18; B60T 8/24; B60T 8/241172; B60T 8/1755; B60T 8/17551; B60T 2250/02; B60T 2250/03; B60T 2230/02; B60W 30/02; B60W 30/045; B60W 40/13; B60W 2520/10; B60W 2520/12; B60W 2520/14; B60W 2520/105; B60W 2520/125; B60W 2530/10; B60W 2050/0034; B60G 2800/70; G01G 19/086

See application file for complete search history.

(56) References Cited

U.S. PATENT DOCUMENTS 5,386,365 A * 1/1995 Nagaoka ......................... 701/44
5,563,792 A * 10/1996 Ander et al. .................... 701/82
(Continued)

FOREIGN PATENT DOCUMENTS

CN         102282052 A    12/2011
JP         2004 516983     6/2004
(Continued)

OTHER PUBLICATIONS

International Search Report Issued Feb. 5, 2013 in PCT/JP13/050249 Filed Jan. 9, 2013.

*Primary Examiner* — Fadey Jabr
*Assistant Examiner* — Kevin P. Mahne
(74) *Attorney, Agent, or Firm* — Oblon, McClelland, Maier & Neustadt, L.L.P.

(57) ABSTRACT

A vehicle control device includes: a weight calculating unit configured to estimate a weight of the vehicle; a traveling state calculating unit configured to estimate a turning characteristic of the vehicle; a guard setting unit configured to change and set at least one of an upper limit value and a lower limit value of the turning characteristic based on the weight of the vehicle estimated by the weight calculating unit; an upper and lower limit processing unit configured to perform a process of putting the turning characteristic into a range of the upper and lower limit values; and a behavior control unit configured to perform behavior control of the vehicle based on the turning characteristic after the process of putting the turning characteristic into the range of the upper and lower limit values.

10 Claims, 15 Drawing Sheets

(51) Int. Cl.
 *B60T 8/1755* (2006.01)
 *B60T 8/172* (2006.01)
 *G01G 19/08* (2006.01)
 *B60W 50/00* (2006.01)

(52) U.S. Cl.
 CPC ......... *B60G 2800/70* (2013.01); *G01G 19/086* (2013.01); *B60T 2250/02* (2013.01); *B60T 8/17551* (2013.01); *B60W 2050/0031* (2013.01); *B60W 2050/0033* (2013.01); *B60W 2520/14* (2013.01); *B60W 2520/20* (2013.01); *B60W 2530/10* (2013.01); *B60T 8/172* (2013.01); *B60T 8/1755* (2013.01)

(56) References Cited

U.S. PATENT DOCUMENTS

| | | | | |
|---|---|---|---|---|
| 5,829,847 | A * | 11/1998 | Tozu et al. | 303/167 |
| 6,253,123 | B1 * | 6/2001 | Schramm et al. | 701/1 |
| 6,782,968 | B2 * | 8/2004 | Sakugawa | 180/446 |
| 8,332,113 | B2 * | 12/2012 | Yasui et al. | 701/70 |
| 8,380,381 | B2 * | 2/2013 | Ichinose et al. | 701/22 |
| 8,515,591 | B2 | 8/2013 | Yokota | |
| 2001/0006306 | A1 * | 7/2001 | Kagawa et al. | 303/20 |
| 2002/0153770 | A1 * | 10/2002 | Matsuno et al. | 303/146 |
| 2003/0144767 | A1 | 7/2003 | Brachert et al. | |
| 2004/0002795 | A1 * | 1/2004 | Tanimoto et al. | 701/1 |
| 2004/0016594 | A1 * | 1/2004 | Yasui et al. | 180/446 |
| 2005/0125131 | A1 * | 6/2005 | Kato et al. | 701/70 |
| 2005/0273241 | A1 * | 12/2005 | Tsukasaki et al. | 701/70 |
| 2007/0050112 | A1 * | 3/2007 | Kroehnert et al. | 701/41 |
| 2008/0109133 | A1 * | 5/2008 | Bedner et al. | 701/41 |
| 2010/0174463 | A1 * | 7/2010 | Uragami et al. | 701/70 |
| 2010/0250068 | A1 * | 9/2010 | Yamazaki | 701/41 |
| 2010/0332098 | A1 * | 12/2010 | Kato | 701/72 |
| 2011/0178689 | A1 * | 7/2011 | Yasui et al. | 701/70 |
| 2011/0257876 | A1 * | 10/2011 | Yokota | 701/124 |
| 2012/0022760 | A1 * | 1/2012 | Kato et al. | 701/70 |
| 2012/0046805 | A1 * | 2/2012 | Nishigaki | 701/1 |
| 2012/0119894 | A1 * | 5/2012 | Pandy | 340/435 |
| 2012/0173040 | A1 * | 7/2012 | Yokota | 701/1 |
| 2012/0209502 | A1 * | 8/2012 | Nichols et al. | 701/124 |
| 2012/0259536 | A1 * | 10/2012 | Klier | 701/124 |
| 2012/0296525 | A1 * | 11/2012 | Endo et al. | 701/42 |
| 2012/0316733 | A1 * | 12/2012 | Futamura et al. | 701/42 |
| 2013/0035829 | A1 * | 2/2013 | Tiberg | 701/56 |
| 2013/0103263 | A1 * | 4/2013 | Hsu et al. | 701/42 |
| 2013/0138288 | A1 * | 5/2013 | Nickolaou et al. | 701/23 |
| 2013/0146374 | A1 * | 6/2013 | Books et al. | 180/65.21 |
| 2013/0238216 | A1 * | 9/2013 | Yamamoto et al. | 701/101 |

FOREIGN PATENT DOCUMENTS

| | | | | |
|---|---|---|---|---|
| JP | 2006 226812 | | 8/2006 | |
| JP | 2010-253975 A | | 11/2010 | |
| JP | 2010 253978 | | 11/2010 | |
| JP | 5024456 B2 | | 9/2012 | |
| WO | 2010 082288 | | 7/2010 | |
| WO | WO 2011/036820 A1 * | | 3/2011 | ............ B60W 40/12 |
| WO | WO 2011/108565 A1 * | | 9/2011 | ............ B60T 8/1755 |

\* cited by examiner

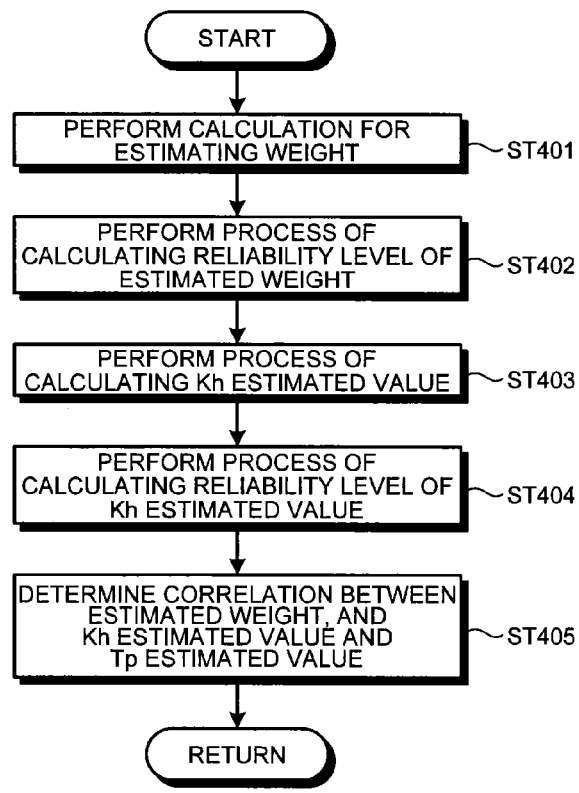

|  | FORWARD/ BACKWARD ACCELERATION | LATERAL ACCELERATION | YAW RATE | VEHICLE SPEED |
|---|---|---|---|---|
| Kh ESTIMATED VALUE | RELIABILITY LEVEL IS LOW AT TIME OF GENERATION | RELIABILITY LEVEL IS HIGH AT TIME OF GENERATION | RELIABILITY LEVEL IS HIGH AT TIME OF GENERATION | RELIABILITY LEVEL IS LOW IN LOW-SPEED ZONE AND VERY HIGH-SPEED ZONE |
| ESTIMATED WEIGHT | RELIABILITY LEVEL IS HIGH AT TIME OF ACCELERATION | RELIABILITY LEVEL IS LOW AT TIME OF GENERATION | RELIABILITY LEVEL IS LOW AT TIME OF GENERATION | RELIABILITY LEVEL IS HIGH IN LOW-SPEED ZONE |

VEHICLE CONTROL DEVICE

FIELD

The present invention relates to a vehicle control device.

BACKGROUND

When a vehicle travels, in a vehicle that controls the behavior of the vehicle in accordance with a traveling state, the behavior control of the vehicle is performed by controlling each device that can control the traveling state of the vehicle while the state amount of the vehicle is detected or estimated. For example, a vehicle control device disclosed in Patent Literature 1 calculates the vehicle weight and the vehicle centroid position and determines a stability factor based on the result of the calculation, thereby controlling the vehicle behavior.

CITATION LIST

Patent Literature

Patent Literature 1: Japanese Patent Application Laid-open No. 2010-253978

SUMMARY

Technical Problem

However, while the centroid position of a vehicle changes in accordance with the state of loading a passenger, a load, or the like in the vehicle, according to Patent Literature 1, the longitudinal centroid position is calculated based on the vehicle weight using a map. Accordingly, the degree of accuracy of the centroid position calculated as above and the estimated value of the stability factor is low, and the control amount of the behavior control of the vehicle is calculated by using such estimated values. Accordingly, the estimated values having a low degree of accuracy may be a factor of the behavior control that causes a driver to have a sense of discomfort.

The present invention is contrived in consideration of the description presented above, and an object thereof is to provide a vehicle control device capable of improving the estimation accuracy of estimated values used for calculating the control amount of the behavior control of the vehicle.

Solution to Problem

In order to solve the above mentioned problem and achieve the object, a vehicle control device according to the present invention includes a weight estimating unit configured to estimate a weight of a vehicle; a traveling state estimating unit configured to estimate a turning characteristic of the vehicle; an upper and lower limit values setting unit configured to change and set at least one of an upper limit value and a lower limit value of the turning characteristic based on the weight of the vehicle estimated by the weight estimating unit; an upper and lower limit processing unit configured to perform a process of putting the turning characteristic estimated by the traveling state estimating unit into a range of the upper and lower limit values set by the upper and lower limit values setting unit; and a behavior control unit configured to perform behavior control of the vehicle based on the turning characteristic after the process of putting the turning characteristic into the range of the upper and lower limit values performed by the upper and lower limit processing unit.

Further, in the vehicle control device, it is preferable that the upper and lower limit values setting unit sets the upper and lower limit values as values determined in advance in a case where the estimation of the weight of the vehicle is not completed by the weight estimating unit at the time of setting the upper and lower limit values.

In order to solve the above mentioned problem and achieve the object, a vehicle control device according to the present invention includes a weight estimating unit configured to estimate a weight of a vehicle; a traveling state estimating unit configured to estimate a turning characteristic of the vehicle; an upper and lower limit values setting unit configured to change and set at least one of an upper limit value and a lower limit value of the weight of the vehicle based on the turning characteristic of the vehicle estimated by the traveling state estimating unit; an upper and lower limit processing unit configured to perform a process of putting the weight of the vehicle estimated by the weight estimating unit into a range of the upper and lower limit values set by the upper and lower limit values setting unit; and a behavior control unit configured to perform behavior control of the vehicle based on a weight of the vehicle after the process of putting the weight of the vehicle into the range of the upper and lower limit values performed by the upper and lower limit processing unit.

Further, in the vehicle control device, it is preferable that a value determined in advance is set to at least one of the weight of the vehicle and the turning characteristic of the vehicle in a case where the weight of the vehicle estimated by the weight estimating unit or the turning characteristic of the vehicle estimated by the traveling state estimating unit is above an upper limit value of a correlation determination range used for determining whether or not the weight of the vehicle or the turning characteristic of the vehicle is reliable, or is below a lower limit value of the correlation determination range.

Further, in the vehicle control device, it is preferable that the traveling state estimating unit estimates the turning characteristic based on the relation between lateral acceleration of the vehicle from which components of a first predetermined frequency and a lower frequency are removed and a yaw rate deviation index value from which a second predetermined frequency or a lower frequency are removed with an index value of a deviation between a transient yaw rate of the vehicle having relation of a first-order lag with respect to a normative yaw rate of the vehicle and an actual yaw rate of the vehicle being set as the yaw rate deviation index value.

Advantageous Effects of Invention

The vehicle control device according to the present invention has an advantage of improving the estimation accuracy of estimated values used for calculating the control amount of the behavior control of the vehicle.

BRIEF DESCRIPTION OF DRAWINGS

FIG. 18 is a flowchart that illustrates a flow at the time of calculating estimated values used for behavior control by using the vehicle control device according to the fourth embodiment.

FIG. 19 is a table that represents the relation between the traveling state of a vehicle and an estimated value.

DESCRIPTION OF EMBODIMENTS

Hereinafter, vehicle control devices according to the present invention will be described in detail with reference to the drawings. However, the present invention is not limited thereto. In each constituent element described in the following embodiments, a member with which the constituent element can be replaced by those skilled in the art or a member that is substantially the same as the constituent element is included.

[First Embodiment]

Figure 1:
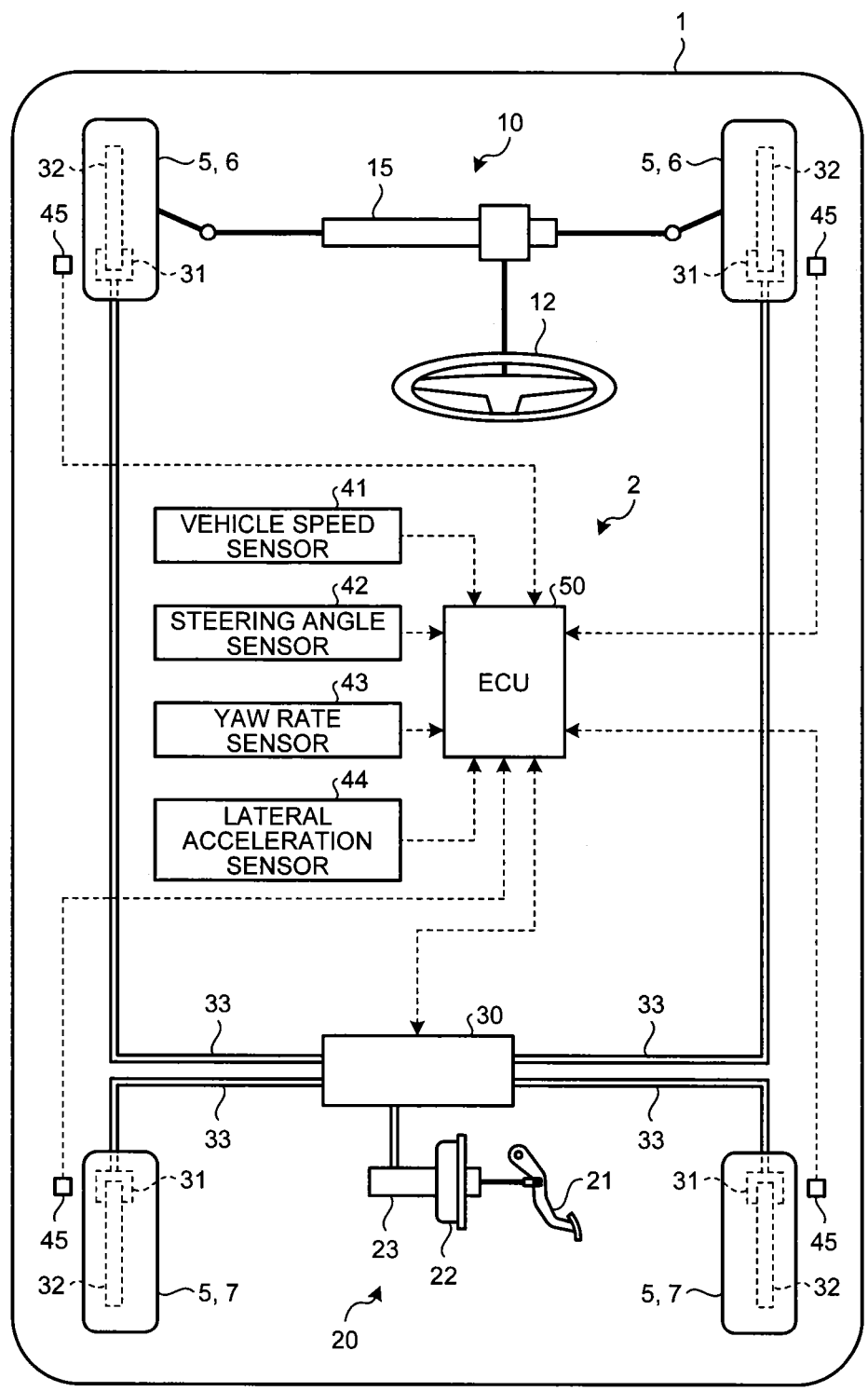
FIG. 1 is a schematic diagram of a vehicle that includes a vehicle control device according to a first embodiment.

FIG. 1 is a schematic diagram of a vehicle that includes a vehicle control device according to a first embodiment. In a vehicle 1 that includes a vehicle control device 2 according to the first embodiment, power generated by a power source such as an engine (not illustrated in the figure) is delivered to driving wheels through a power transmission device such as an automatic transmission (not illustrated in the figure), and the power is used by the driving wheels as a driving force, whereby the vehicle 1 can travel. Here, the power source, for example, may be a motor other than the engine, or so-called a hybrid vehicle that uses both an engine and a motor may be used. In addition, the driving form may be front-wheel driving in which front wheels 6 are used as the driving wheels, rear-wheel driving in which rear wheels 7 are used as driving wheels, or four-wheel driving in which both the front wheels 6 and the rear wheels 7 are used as the driving wheels.

The front wheels 6 are used also as steering wheels. Accordingly, the front wheels 6 are configured to be able to be steered by a steering device 10. This steering device 10 includes a steering wheel 12 that is used as a steering operator by a driver and a steering angle imparting device 15 that operates in accordance with a steering operation of the steering wheel 12. The steering angle imparting device 15, for example, is configured by so-called a rack & pinion mechanism that includes a rack gear and a pinion gear.

In addition, in the vehicle 1, a braking device 20 that decelerates or stops the vehicle 1 during traveling is disposed. This braking device 20 includes: a brake pedal 21 that is operated by the driver; a brake boosting device 22 that boosts the tread force when the driver performs a brake operation for the brake pedal 21; and a master cylinder 23 that converts a force boosted by the brake boosting device 22 into brake fluid pressure according to the amount of the operation of the brake pedal 21. In addition, the braking device 20 includes: a wheel cylinder 31 that is arranged near each wheel 5 and is operated in accordance with the brake fluid pressure; a brake disk 32 that is disposed to form a set with the wheel cylinder 31 and rotates integrally with the vehicle wheel 5 when the vehicle wheel 5 rotates; and a brake fluid pressure control device 30 that is connected to the wheel cylinder 31 through a hydraulic route 33 and controls brake fluid pressure operating on the wheel cylinder 31 when a braking operation is performed by the driver.

Among these, the brake fluid pressure control device 30 is disposed to independently control the oil pressure of each wheel cylinder 31 disposed near each vehicle wheel 5. Accordingly, the brake fluid pressure control device 30 can independently control the braking forces of a plurality of the vehicle wheels 5.

In addition, in the vehicle 1, a vehicle speed sensor 41 that is a vehicle speed detecting means detecting vehicle speed when the vehicle 1 travels through detecting the rotation speed of power output from the automatic transmission or the like to the driving wheel side, a steering angle sensor 42 that is disposed in the steering device 10 and is a steering angle detecting means detecting a steering angle that is the rotation angle of the steering wheel 12, a yaw rate sensor 43 that is a yaw rate detecting means detecting a yaw rate when the vehicle 1 travels, and a lateral acceleration sensor 44 that is a lateral acceleration detecting means detecting the acceleration of the vehicle 1 in the vehicle width direction are disposed.

Furthermore, near each vehicle wheel 5, a vehicle wheel speed sensor 45 that is a vehicle speed detecting means detecting a vehicle wheel speed that is the rotation speed of the vehicle wheel 5 is disposed. The vehicle speed sensor 41, the steering angle sensor 42, the yaw rate sensor 43, the lateral acceleration sensor 44, and the vehicle wheel speed sensor 45 are connected to an ECU Electronic Control Unit) 50 that controls each unit of the vehicle 1, and a detection result acquired by each sensor is configured to be acquired by the ECU 50.

Figure 2:
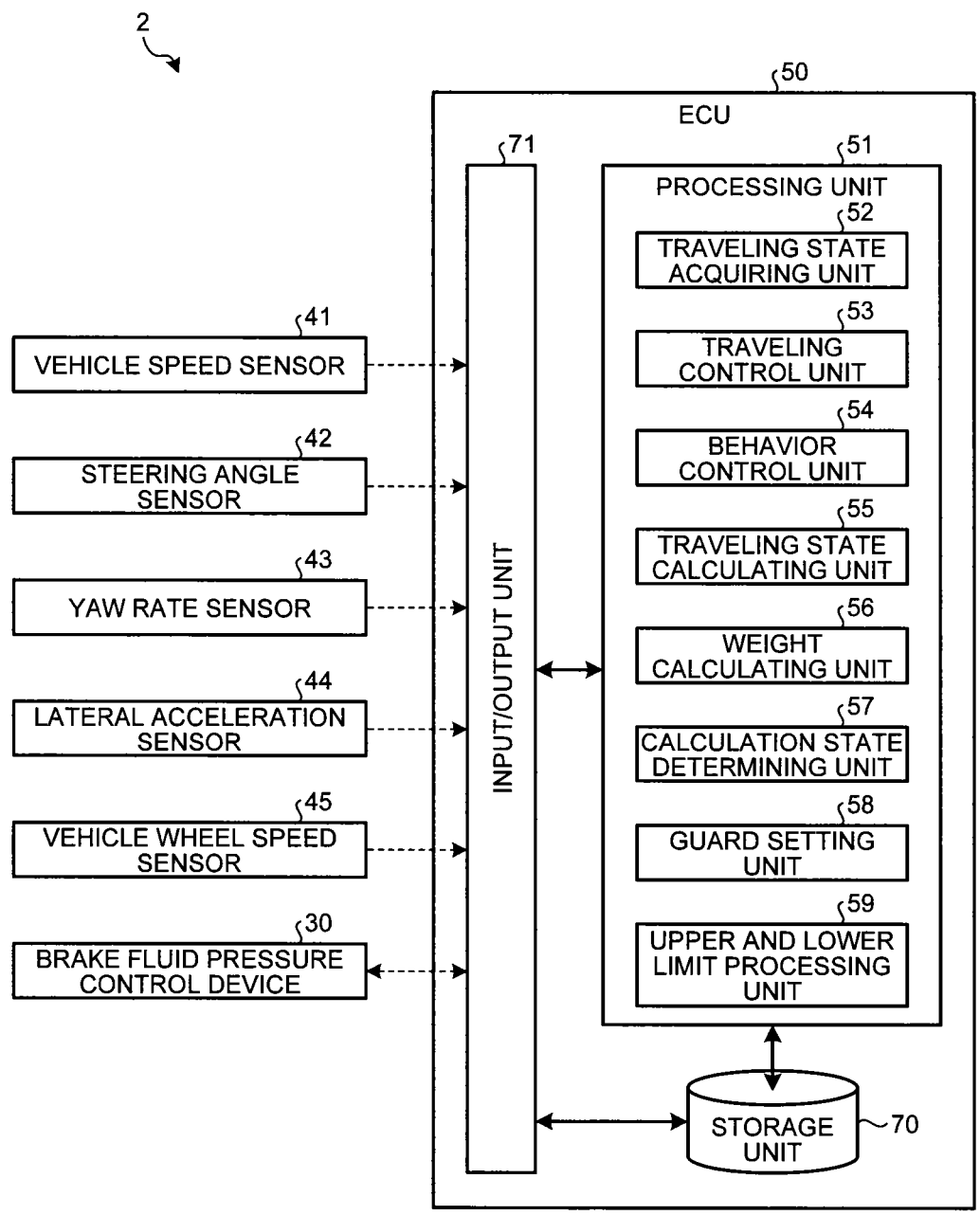
FIG. 2 is a configuration diagram of a main portion of the vehicle control device illustrated in FIG. 1.

FIG. 2 is a configuration diagram of a main portion of the vehicle control device illustrated in FIG. 1. In the ECU 50, a processing unit 51 including a CPU (Central Processing Unit) and the like, a storage unit 70 such as a RAM (Random Access Memory), and an input/output unit 71 are disposed, and these components are interconnected so as to be able to transmit and receive signals therebetween. In addition, sensors such as the vehicle speed sensor 41, the steering angle sensor 42, the yaw rate sensor 43, the lateral acceleration sensor 44, and the vehicle wheel speed sensor 45 connected to the ECU 50 are connected to the input/output unit 71, and the input/output unit 71 inputs and outputs signals between the sensors. In addition, devices such as the engine, the automatic transmission, and the brake fluid pressure control device 30 are connected to the ECU 50, and each device connected to the ECU 50 is connected to the input/output unit 71 and inputs/outputs signals to/from the input/output unit 71. In the storage unit 70, a computer program that controls the vehicle 1 is stored.

The processing unit 51 of the ECU 50 disposed as above includes: a traveling state acquiring unit 52 that acquires the traveling state of the vehicle 1 and the driving operation state of the driver; a traveling control unit 53 that performs traveling control of the vehicle 1; a behavior control unit 54 that performs behavior control when the vehicle 1 travels; a traveling state calculating unit 55 that is a traveling state estimating unit estimating the traveling state of the vehicle 1 including the turning characteristic of the vehicle 1; a weight calculating unit 56 that is a weight estimating unit estimating the weight of the vehicle 1; a calculation state determining unit 57 that determines the calculation processing states of various calculations performed when the vehicle 1 travels; a guard setting unit 58 that is an upper/lower limit values setting unit settings at least one of an upper limit value and a lower limit value of the turning characteristic based on the weight of the vehicle 1; and an upper and lower limit processing unit 59 that performs a process of putting the turning characteristic estimated by the traveling state calculating unit 55 in the range of the upper and lower limits of the turning characteristic set by the guard setting unit 58.

In a case where the vehicle 1 is controlled by the ECU 50, for example, based on the detection result acquired by the vehicle speed sensor 41 and the like, the processing unit 51 reads the above-described computer program into a memory built in the processing unit and performs calculation, and, the engine and the like are controlled in accordance with the result of the calculation, whereby the operation control of the vehicle 1 is performed. At that time, the processing unit stores values that are in the middle of the calculation in the storage unit 70, takes out the stored values, and performs calculation by using the values.

The vehicle control device 2 according to this first embodiment is configured as described above, and, hereinafter, the operations thereof will be described. When the vehicle 1 including the vehicle control device 2 travels, a driving force is generated in the driving wheels by controlling a power source such as an engine using the ECU 50 in accordance with a driver's input operation for an accelerator pedal that is arranged in parallel with the brake pedal 21, whereby traveling control is performed so as to be in a desired traveling state. At that time, the ECU 50 performs traveling control including the control of the vehicle speed detected by the vehicle speed sensor 41 and the vehicle wheel speed detected by the vehicle wheel speed sensor 45. In other words, the vehicle speed and the vehicle wheel speed detected by the vehicle speed sensor 41 and the vehicle wheel speed sensor 45 are acquired by the traveling state acquiring unit 52 included in the processing unit 51 of the ECU 50, and control of the engine and the like including the traveling state of the vehicle 1 that is acquired by the traveling state acquiring unit 52 is performed by using the traveling control unit 53 included in the processing unit 51 of the ECU 50.

In addition, when the vehicle 1 travels, the vehicle speed is adjusted by not only generating a driving force but also generating a braking force. Thus, in a case where the braking force is generated in the vehicle 1, the driver operates the brake pedal 21. The operating force at the time of operating the brake pedal 21 is applied to the wheel cylinder 31 as brake fluid pressure through the brake boosting device 22, the master cylinder 23, the brake fluid pressure control device 30, and the hydraulic route 33. The wheel cylinder 31 is operated in accordance with this brake fluid pressure and reduces the rotation speed of the brake disk 32 rotating integrally with the vehicle wheels 5 using a friction force. Accordingly, since the rotation speed of the vehicle wheels 5 is also reduced, the vehicle wheels 5 generate a braking force with respect to the road surface, whereby the speed of the vehicle 1 reduces.

The brake fluid pressure control device 30 is configured to be able to operate based on the operation for the brake pedal 21 or regardless of the operating state of the brake pedal 21 so as to generate oil pressure. In addition, the brake fluid pressure control device 30 can be controlled by the ECU 50, and, by controlling the brake fluid pressure control device 30, the ECU 50 can generate a braking force regardless of the operating state of the brake pedal 21.

In a case where the direction of travel of the vehicle 1 is changed as in the case of turning the vehicle 1 or the like, the steering wheel 12 is operated by being rotated. As above, in a case where the steering wheel 12 is rotated, the running torque is delivered to the front wheels 6 as a force in a direction for changing the direction by the steering angle imparting device 15 included in the steering device 10. Accordingly, the direction of the rotation axis of the front wheels 6 changes to be a direction different from the direction of travel of the vehicle 1, whereby the direction of travel of the vehicle 1 changes so as to perform a turning operation or the like.

In this way, while the vehicle 1 turns by operating the steering wheel 12, the steering angle changed by operating the steering wheel 12 is detected by the steering angle sensor 42 that is disposed in the steering device 10. The steering angle detected by the steering angle sensor 42 is delivered to the traveling state acquiring unit 52 included in the processing unit 51 of the ECU 50 and is acquired by the traveling state acquiring unit 52.

In addition, in a case where the vehicle 1 turns, a yaw moment that is a rotation force around the vertical axis of the vehicle 1 is generated in the vehicle 1. In a case where the yaw moment is generated in the vehicle 1, the yaw rate sensor 43 detects a yaw rate that is yaw angular velocity when the yaw moment is generated and the vehicle 1 rotates around the vertical axis. Furthermore, in a case where the vehicle 1 turns, since a centrifugal force is generated in the vehicle 1, acceleration in the widthwise direction of the vehicle 1, in other words, lateral acceleration that is acceleration in the lateral direction is generated in accordance with the centrifugal force. As above, the lateral acceleration generated during the turning of the vehicle 1 is detected by the lateral acceleration sensor 44. The yaw rate detected by the yaw rate sensor 43 and the lateral acceleration detected by the lateral acceleration sensor 44 are delivered to the traveling state acquiring unit 52 and are acquired by the traveling state acquiring unit 52.

In addition, the vehicle control device 2 according to this first embodiment performs behavior control in which the behavior of the vehicle 1 is stabilized by controlling the output of the engine, the braking force of each vehicle wheel 5, and the like when the vehicle 1 turns. In this behavior control, based on the traveling state of the vehicle 1 that is acquired by the traveling state acquiring unit 52, the control amount for stabilizing the behavior is calculated by the behavior control unit 54 included in the processing unit 51 of the ECU 50, and each unit is controlled by the traveling control unit 53 based on the calculated control amount, whereby the behavior control is performed when the vehicle 1 travels.

As above, in a case where the behavior control of the vehicle 1 is performed, a state amount that represents the behavior state at a time when the vehicle 1 travels is estimated. The estimation of the state amount of the vehicle 1 is performed based on the turning characteristic of the vehicle 1. Describing the turning characteristic of the vehicle 1, when a coefficient attached to the vehicle speed of the time constant of a first-order lag in the relation of the first-order lag of the actual yaw rate of the vehicle 1 with respect to the normative yaw rate of the vehicle 1 is set as a steering response time constant coefficient, the stability factor and the steering response time constant coefficient of the vehicle 1 represent the turning characteristic of the vehicle 1. Accordingly, the state amount of the vehicle 1 is estimated by estimating the stability factor.

This stability factor is estimated by estimating a normative yaw rate based on a detection result detected by each sensor at the time when the vehicle 1 turns and estimating the stability factor based on the normative yaw rate and the actual yaw rate detected by the yaw rate sensor 43. At that time, there are cases where the sensors include a detection error such as a zero-point offset. Accordingly, when the stability factor is estimated, based on a deviation between a transient yaw rate of the vehicle 1 that is in the relation of the first-order lag with respect to the steady normative yaw rate of the vehicle 1 and the actual yaw rate of the vehicle 1 and the lateral acceleration of the vehicle 1, the estimated value of the stability factor is corrected by learning such that the estimated value of the stability factor is close to a real stability factor while the influence of the detection error is suppressed.

Figure 3:
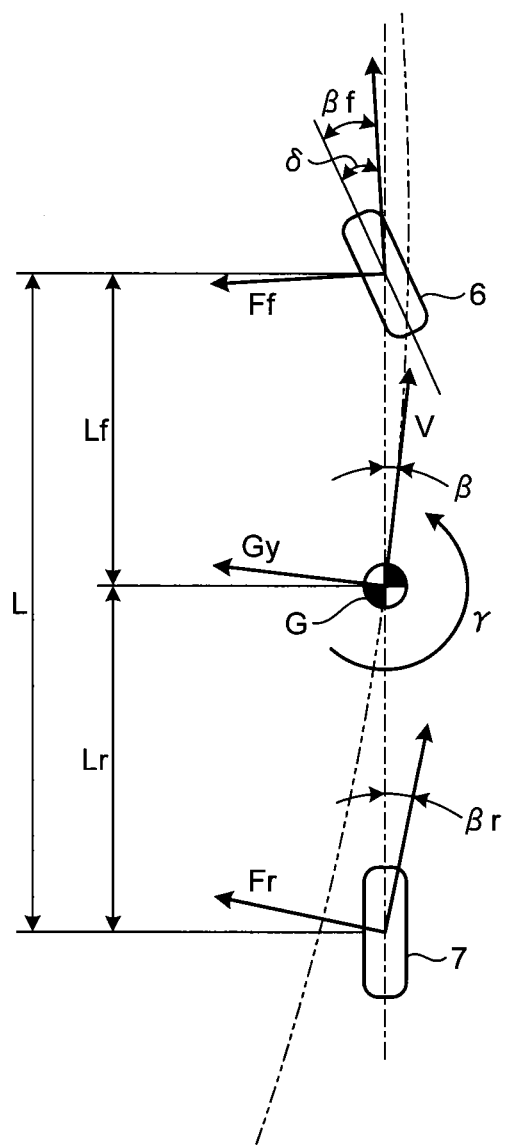
FIG. 3 is an explanatory diagram of values that are used for estimating the state amount of the vehicle.

FIG. 3 is an explanatory diagram of each value that is used for estimating the state amount of the vehicle. A technique used when the state amount of the vehicle 1 will now be described. First, the weight of the vehicle 1 will be denoted by M, the yaw inertial moment will be denoted by I, distances between the centroid G of the vehicle 1 and the front-wheel vehicle axis and the rear-wheel vehicle axis will be respectively denoted by Lf and Lr, and an inter-axial distance of the vehicle 1 will be denoted by L (=Lf+Lr). In addition, the cornering forces of the front wheel 6 and the rear wheel 7 will be respectively denoted by Ff and Fr, and the cornering power of the front wheel 6 and the rear wheel 7 will be respectively denoted by Kf and Kr. Furthermore, the actual steering angle of the front wheel 6 will be denoted by δ, the slip angles of the front wheel 6 and the rear wheel 7 will be respectively denoted by βf and βr, and the slip angle of the vehicle body will be denoted by β. In addition, the lateral acceleration of the vehicle 1 will be denoted by Gy, the yaw rate of the vehicle 1 will be denoted by γ, the vehicle speed will be denoted by V, and the yaw angular acceleration (a derivative of the yaw rate) of the vehicle 1 will be denoted by γd. In such a case, due to the balance of the forces and the moments of the vehicle 1 and the like, the following Equations (1) to (6) are established.

$$MGy = Ff + Fr \quad (1)$$

$$I\gamma d = LfFf - LrFr \quad (2)$$

$$Ff = -Kf\beta f \quad (3)$$

$$Fr = -Kr\beta r \quad (4)$$

$$\beta f = \beta + (Lf/V)\gamma - \delta \quad (5)$$

$$\beta r = \beta - (Lr/V)\gamma \quad (6)$$

In addition, the following Equation (7) is established using the above-described Equations (1) to (6).

$$\left(\frac{Lr}{Kf} - \frac{Lf}{Kr}\right)\frac{M}{L}Gy + \left(\frac{1}{Kf} + \frac{1}{Kr}\right)\frac{1}{L}\gamma d = \delta - \frac{L}{V}\gamma \quad (7)$$

By assuming that the vehicle speed V is substantially constant, performing Laplace transform of the above-described Equation (7) with the Laplace operator being set as s, and arranging the resultant equation with respect to the yaw rate γ, the following Equations (8) to (10) are established, and thus, the normative yaw rate γ(s) is acquired by using such equations.

$$\gamma(s) = \frac{1}{1 + TpVs}\left(\frac{\delta(s)}{L} - KhGy(s)\right)V \quad (8)$$

$$Kh = \frac{M}{L^2}\left(\frac{Lr}{Kf} - \frac{Lf}{Kr}\right) \quad (9)$$

$$Tp = \frac{I}{L^2}\left(\frac{1}{Kf} + \frac{1}{Kr}\right) \quad (10)$$

Kh represented in the above-described Equation (9) is a stability factor, and Tp represented in the above-described Equation (10) is a coefficient attached to the vehicle speed V of the first-order lag system having a time constant that depends on the vehicle speed, in other words, a coefficient referred to as a "steering response time constant coefficient" in the first embodiment. Such values are parameters that characterize the steering response relating to the yaw motion of the vehicle 1 and represent the turning characteristic of the vehicle 1. In addition, the above-described Equation (8) is an equation used for calculating the yaw rate γ of the vehicle 1 using the actual steering angle δ of the front wheel 6, the vehicle speed V, and the lateral acceleration Gy. When the yaw rate calculated by using this linearized model is referred to as a transient yaw rate γtr, the transient yaw rate γtr is a value of the first-order lag with respect to the steady normative yaw rate represented in the following Equation (11).

$$\gamma t = \left(\frac{\delta}{L} - KhGy\right)V \quad (11)$$

Accordingly, in the above-described configuration, the transient yaw rate γtr may be calculated using the following Equation (12) corresponding to the above-described Equation (8).

$$\gamma tr = \frac{1}{1 + TpVs}\gamma t \quad (12)$$

$$= \frac{1}{1 + TpVs}\left(\frac{\delta}{L} - KhGy\right)V$$

When a designed value and a real value of the stability factor are denoted by Khde and Khre, a deviation Δγt between the steady normative yaw rate γt and the detected yaw rate γ at the time of steady turning of the vehicle 1 is represented by the following Equation (13).

$$\Delta \gamma t = \left(\frac{V\delta}{L} - KhdeGyV\right) - \gamma \quad (13)$$

$$= \left(\frac{V\delta}{L} - KhdeGyV\right) - \left(\frac{V\delta}{L} - KhreGyV\right)$$

$$= (Khre - Khde)GyV$$

When the yaw rate deviation Δγt is converted into a deviation Δδt of the steering angle of the front wheel 6 by multiplying both sides of the above-described Equation (13) with L/V, the deviation Δδt of the steering angle of the front wheel 6 is represented by the following Equation (14). The deviation Δδt of the steering angle of the front wheel 6 is one of yaw rate deviation index values that are index values of the deviation between the steady normative yaw rate γt and detected yaw rate γ and is not dependent on the vehicle speed.

$$\Delta\delta t = (Khre - Khde)GyL \quad (14)$$

Accordingly, as an index value of the deviation between the steady normative yaw rate γt and the detected yaw rate γ, the deviation Δδt of the steering angle of the front wheel 6 can be calculated using Equation (14). By acquiring a grade (Khre–Khde) L of the relation of the deviation Δδt of the steering angle of the front wheel 6 with respect to the lateral acceleration Gy, in other words, the relation between the lateral acceleration Gy and the deviation Δδt of the steering angle of the front wheel 6 in an orthogonal coordinate system using a least squares method or the like in accordance with Equation (14), it is understood that an estimated value Khp of the stability factor can be acquired using the following Equation (15).

$$Khp = Khde + Grade/L \quad (15)$$

When errors of the zero-point offsets of the sensor for the yaw rate γ, the lateral acceleration Gy, and the steering angle δ of the front wheel 6 of the vehicle 1 are respectively denoted by γ0, Gy0, and δ80, detected values of the yaw rate, the lateral acceleration, and the steering angle of the front wheel 6 of the vehicle 1 are respectively γ+δ0, Gy+Gy0, and δ+δ0. Accordingly, the deviation Δγt between the steady normative yaw rate γt and the detected yaw rate at the time of steady turning of the vehicle 1 or the like is represented by the following Equation (16).

$$\Delta \gamma t = \left(\frac{V(\delta + \delta 0)}{L} - Khde(Gy + Gy0)V\right) - (\gamma + \gamma 0) \quad (16)$$

$$= \left(\frac{V(\delta + \delta 0)}{L} - Khde(Gy + Gy0)V\right) - \left(\frac{V\delta}{L} - KhreGyV + \gamma 0\right)$$

$$= (Khre - Khde)GyV + \frac{V\delta 0}{L} - KhdeGy0L - \gamma 0$$

Figure 4:
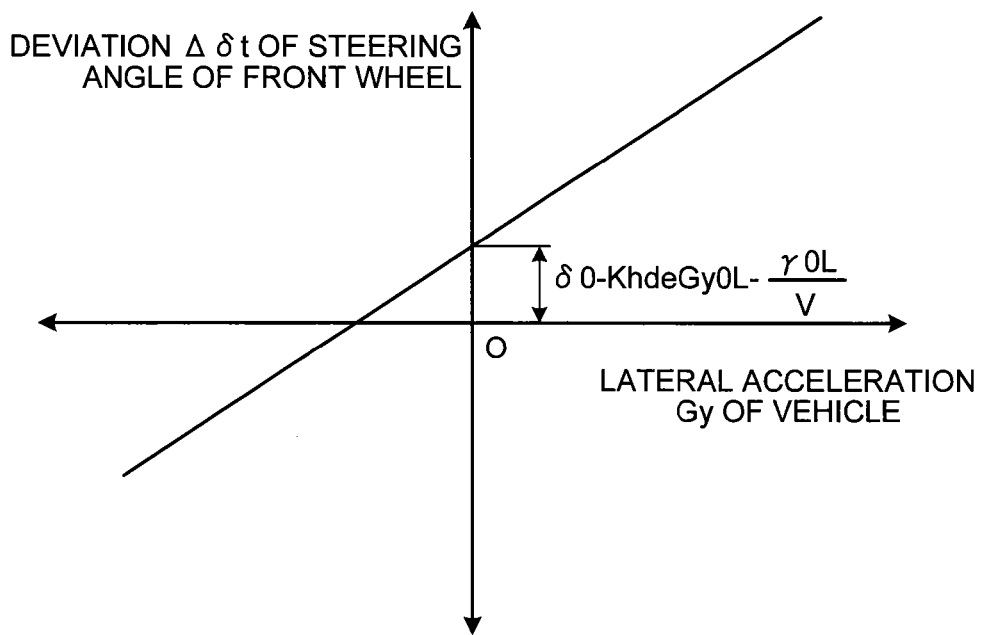
FIG. 4 is an explanatory diagram that illustrates the relation between the lateral acceleration Gy and a deviation $\Delta\delta t$ of the steering angle of the front wheel of the vehicle.

FIG. 4 is an explanatory diagram that illustrates the relation between the lateral acceleration Gy and the deviation Δδt of the steering angle of the front wheel of the vehicle. By converting the yaw rate deviation Δγt into the deviation Δδt of the steering angle of the front wheel 6 by multiplying L/V to both sides of the above-described Equation (16), the deviation Δδt of the steering angle of the front wheel 6 is represented by the following Equation (17). The relation between the lateral acceleration Gy of the vehicle 1 and the deviation Δδt of the steering angle of the front wheel 6 represented by the following Equation (17) is as represented in FIG. 4.

$$\Delta\delta t = (Khre - Khde)GyL + \delta 0 - KhdeGy0L - \frac{\gamma 0 L}{V} \quad (17)$$

In the above-described Equation (17), while δ0–KhdeGy0L is a constant, γ0L/V changes in accordance with the vehicle speed. Accordingly, a section of a graph represented in FIG. 4 on the vertical axis changes in accordance with the vehicle speed V. Accordingly, in a case where an error of the zero-point offset of the sensor is included in the detected value of the yaw rate γ of the vehicle 1, the relation of the deviation Δδt of the steering angle of the front wheel 6 with respect to the lateral acceleration Gy changes in accordance with the vehicle speed, and accordingly, the stability factor cannot be estimated with high accuracy.

In addition, in order to improve the estimation accuracy of the stability factor, a countermeasure such as estimating of a stability factor for each vehicle speed or the like is necessary. Accordingly, data such as yaw rates γ and the like that are required for the estimation of the stability factor is vast, and there is problem in that the calculation load at the time of performing calculation using the ECU 50 is excessive, and a long time is required for estimating the stability factor.

Figure 5:
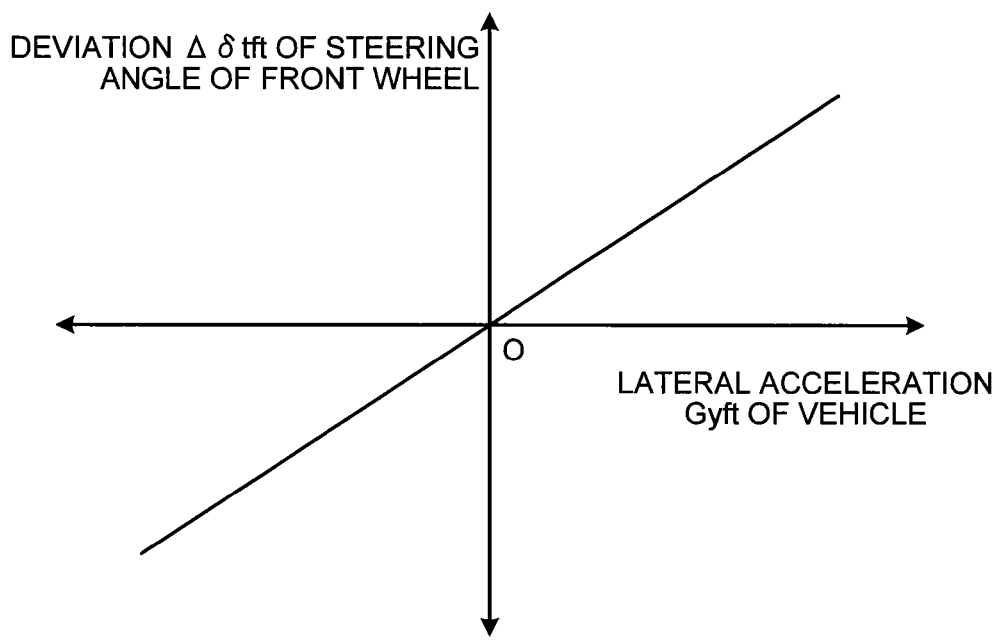
FIG. 5 is an explanatory diagram that illustrates the relation between the lateral acceleration Gyft of the vehicle and a deviation Δδtft of the steering angle of the front wheel.

FIG. 5 is an explanatory diagram that illustrates the relation between the lateral acceleration Gyft of the vehicle and a deviation Δδtft of the steering angle of the front wheel. Here, the lateral acceleration of the vehicle 1 from which components of a first predetermined frequency or a lower frequency have been eliminated will be denoted by Gyfy, and the yaw rate deviation index value that is the deviation of the steering angle of the front wheel 6 from which components of a second predetermined frequency or a lower frequency have been eliminated will be denoted by Δδtft. When the first and second predetermined frequencies have values that are sufficiently higher than the speed of change of the γ0L/V accompanied with a change in the vehicle speed V, an error Gy0 is not included in Gyft, and an error due to an error γ0 or δ0 is not included in Δδtft. Accordingly, the following Equation (18) that corresponds to the above-described Equation (14) is established. The relation between the lateral acceleration Gyft of the vehicle 1 and the deviation Δδtft of the steering angle of the front wheel 6 represented by the following Equation (18) is as represented in FIG. 5, and a straight line represented by Equation (18) passes through the origin regardless of the vehicle speed V.

$$\Delta\delta tft = (Khre - Khde)GyftL \quad (18)$$

Accordingly, by acquiring an estimated value Khp of the stability factor using the above-described Equation (15) by acquiring a grade (Khre–Khde) L of the relation of the deviation Δδtft of the steering angle of the front wheel 6 with respect to the lateral acceleration Gyft, in other words, the relation between the lateral acceleration Gyft and the deviation Δδtft of the steering angle of the front wheel 6 in the orthogonal coordinate system, the estimated value Khp of the stability factor can be acquired without being influenced by the error of the zero-point offset of the sensor. Accordingly, in the above-described configuration, the estimated value of the stability factor may be calculated using the above-described Equation (15) by using a ratio of the deviation Δδtft of the steering angle of the front wheel 6 to the lateral acceleration Gyft as the grade.

Figure 6:
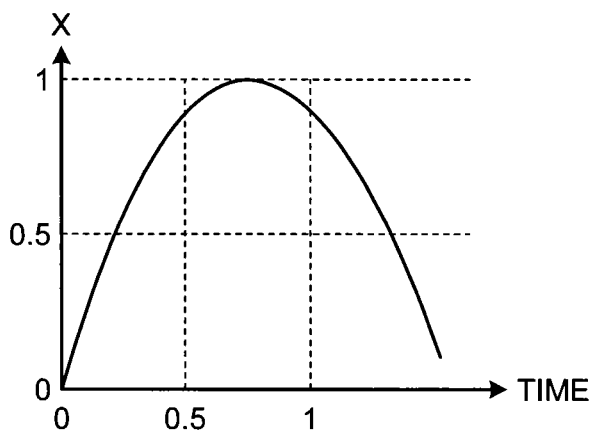
FIG. 6 represents graphs that illustrate a time series waveform X, a time series waveform Y, and a Lissajous waveform of X and Y.
Figure 6:
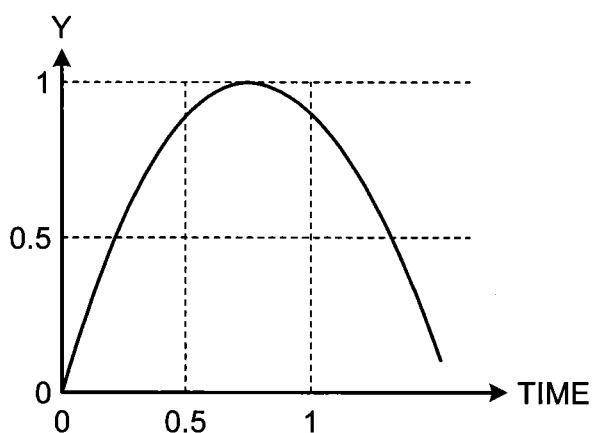
Figure 6:
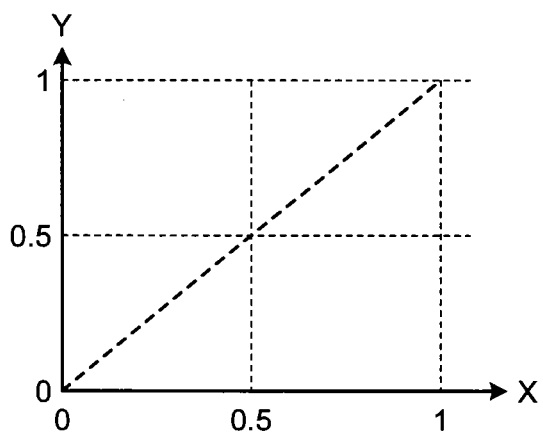
Figure 7:
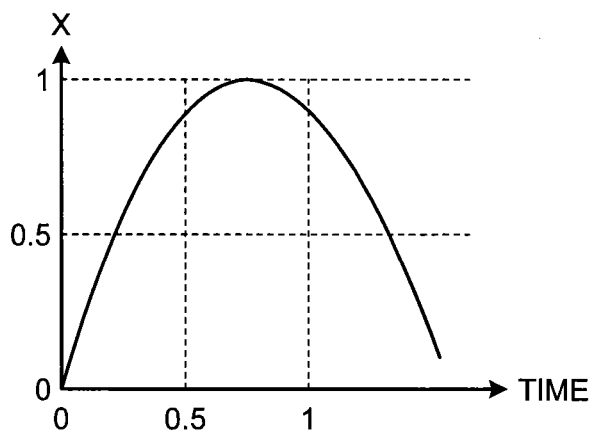
FIG. 7 represents graphs that illustrate a time series waveform X, a time series waveform Y, and a Lissajous waveform of X and Y.
Figure 7:
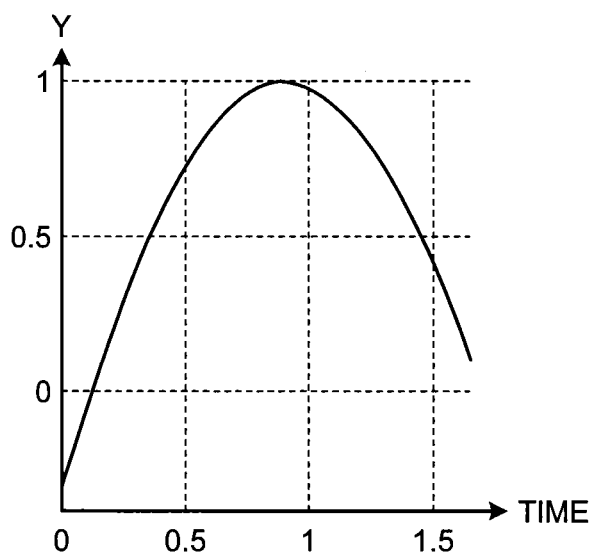
Figure 7:
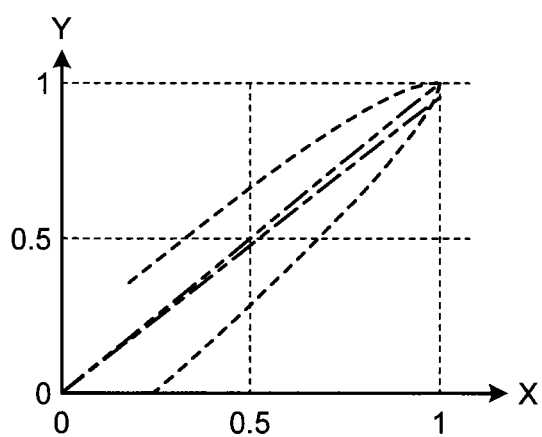
Figure 8:
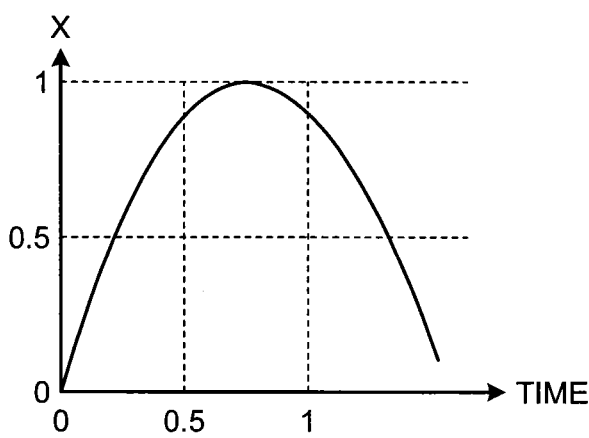
FIG. 8 represents graphs that illustrate a time series waveform X, a time series waveform Y, and a Lissajous waveform of X and Y.
Figure 8:
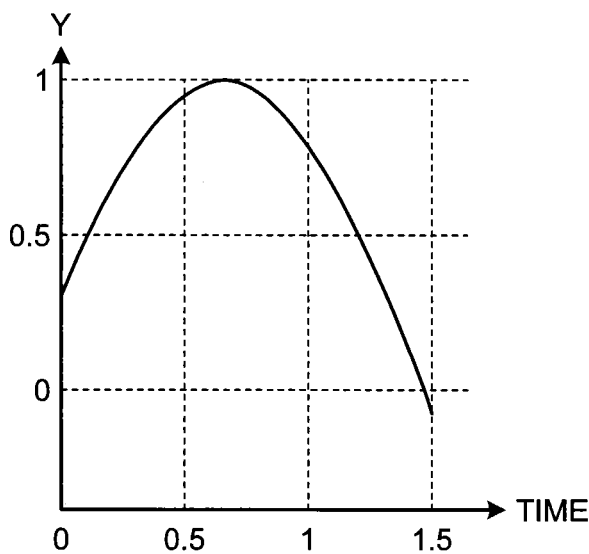
Figure 8:
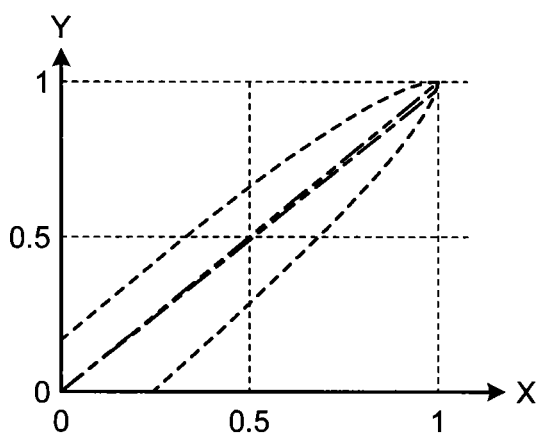

FIGS. 6 to 8 represent graphs each illustrating a time series waveform X, a time series waveform Y, and a Lissajous waveform of X and Y. Particularly, FIG. 6 illustrates a case where there is no phase difference between two time series waveforms X and Y, FIG. 7 illustrates a case where the phase of the time series waveform Y lags behind the phase of the time series waveform X, and FIG. 8 illustrates a case where the phase of the time series waveform Y leads that of the time series waveform X. In FIGS. 7 and 8, a thick dashed line represents a Lissajous waveform of an accumulated value of X and an accumulated value of Y. As illustrated in FIGS. 6 to 8, according to the ratio of the accumulated value of Y to the accumulated value of X, even in a case where there is a phase difference between the two time series waveforms X and Y, the ratio Y/X can be acquired with the influence thereof being reduced. Accordingly, in the above-described configuration, the estimated value of the stability factor may be calculated using the above-described Equation (15) by using the ratio of the accumulated value Δδtfta of the deviation Δδtft of the steering angle of the front wheel 6 to the accumulated value Gyfta of the lateral acceleration Gyft as the grade.

As above, while the case at the time of steady turning of the vehicle 1 has been described, at the time of transient turning of the vehicle 1, a filtering process of the first-order lag is performed for the deviation Δδtft of the steering angle of the front wheel 6 and the accumulated value Δδtfta thereof, and a filtering process of the first-order lag is performed for the lateral acceleration Gyft and the accumulated value Gyfta thereof. In such a case, by configuring the time constants of the filtering processes of the first-order delay to be the same, a grade is calculated, similarly to the case of the steady turning of the vehicle 1, based on the values after the filtering process of the first-order lag, and an estimated value of the stability factor can be calculated using the above-described Equation (15).

In addition, in the above-described configuration, it may be configured such that components of a first predetermined frequency or a lower frequency are eliminated from the lateral acceleration of the vehicle 1 by a high-pass filtering process, and components of a second predetermined frequency or a lower frequency are eliminated from the yaw rate deviation index value by a high-pass filtering process. Furthermore, in the above-described configuration, the first and second predetermined frequencies may be configured to be the same.

Furthermore, in the above-described configuration, when the vehicle speed is denoted by V, and the inter-axial distance of the vehicle 1 is denoted by L, by multiplying the deviation between the transient yaw rate of the vehicle 1 and the actual yaw rate of the vehicle 1 by L/V, a value acquired by converting the deviation between the transient yaw rate of the vehicle 1 and the actual yaw rate of the vehicle 1 into a deviation of the steering angle of the front wheel 6 may be configured to be calculated. In addition, in the above-described configuration, in a case where the degree of convergence of the estimated value of the stability factor is high, the dead band of the movement control of the vehicle 1 may be changed to be smaller than that of a case where the degree of convergence of the estimated value of the stability factor is low.

While the stability factor is estimated by performing such calculation at the time of turning the vehicle 1, according to the vehicle control device 2 of this first embodiment, additionally, to a Kh estimated value that is the estimated value of the stability factor, an upper and lower limit guard that represents upper and lower limit values of the Kh estimated value is set by the guard setting unit 58. In other words, the upper and lower limit values are set to the Kh estimated value by the guard setting unit 58 included in the processing unit 51 of the ECU 50. The values of the upper and lower limit guard are changeable, and more particularly, are configured to be changed in accordance with the weight of the vehicle 1. In other words, the guard setting unit 58 is configured to change the values of the upper and lower limits of the Kh estimated value in accordance with the weight of the vehicle 1.

Figure 9:
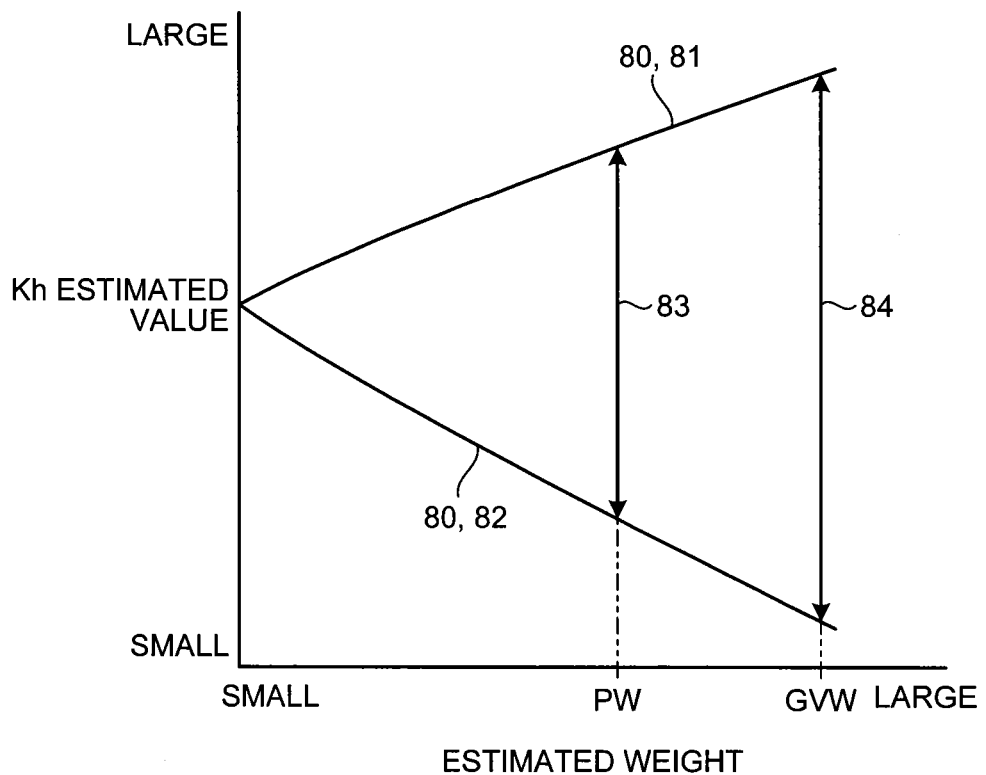
FIG. 9 is an explanatory diagram relating to an upper and lower limit guard of a stability factor.

FIG. 9 is an explanatory diagram relating to an upper and lower limit guard of the stability factor. The limitation on an upper and lower limit guard 80 set to the Kh estimated value is loosened more as the estimated weight of the vehicle 1 increases. In other words, in the upper and lower limit guard 80, an upper limit value 81 set as the upper limit of the Kh estimated value is set to be larger as the weight of the vehicle 1 increases. On the other hand, in the upper and lower limit guard 80, a lower limit value 82 set as the lower limit of the Kh estimated value is set to be smaller as the weight of the vehicle 1 increases. The upper and lower limit guard 80 is set to be changed in accordance with the weight of the vehicle 1 as above and is stored in the storage unit 70 of the ECU 50 in the state of a map.

When the stability factor is estimated, the upper and lower limit guard 80 is set by the guard setting unit 58 by using this map. In other words, since the upper and lower limit guard 80 is changed in accordance with the weight of the vehicle 1, the upper and lower limit guard 80 is set to a value according to the current weight of the vehicle 1 by the guard setting unit 58. Accordingly, the values of the upper and lower limit guard 80 are set to values according to the current weight of the vehicle 1, and the Kh estimated value that is the value of the stability factor estimated by the above-described calculation and the values of the upper and lower limit guard 80 are compared with each other by the upper and lower limit processing unit 59 included in the processing unit 51 of the ECU 50. In accordance with this comparison, in a case where the Kh estimated value is not within the range of the values of the upper and lower limit guard 80, the Kh estimated value is reset.

Figure 10:
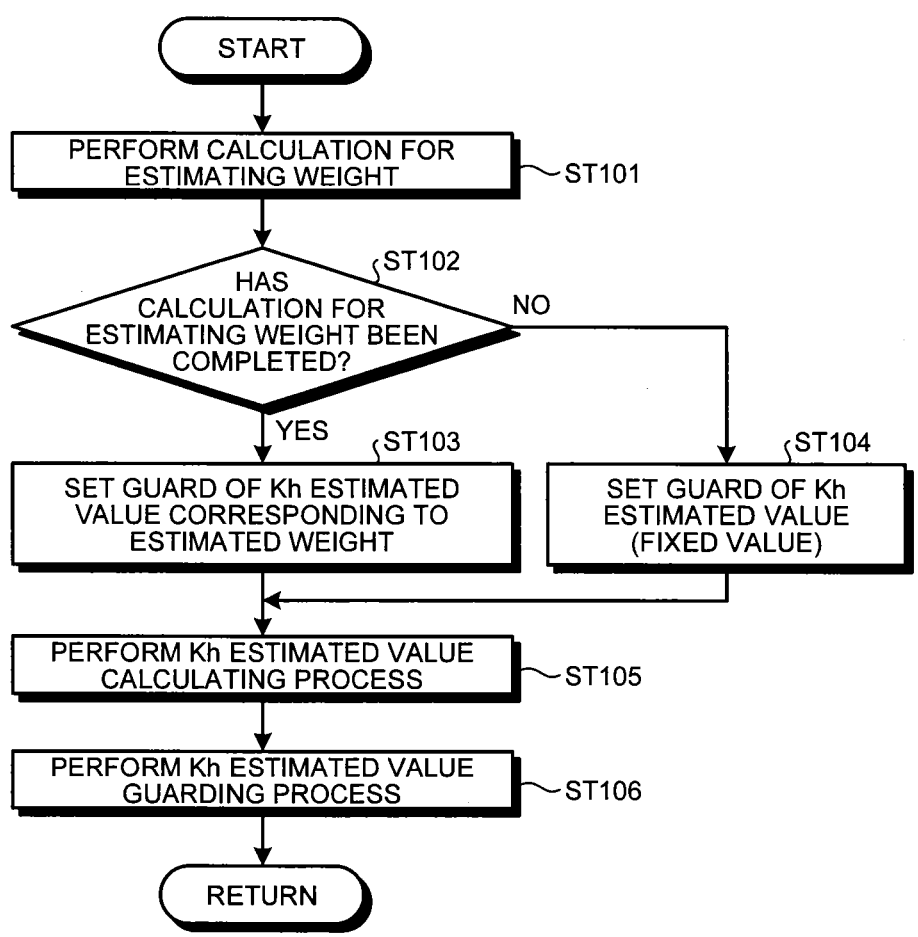
FIG. 10 is a flowchart that illustrates a flow at the time of estimating the stability factor by using the vehicle control device according to the first embodiment.

FIG. 10 is a flowchart that illustrates a flow at the time of estimating the stability factor by using the vehicle control device according to the first embodiment. Next, an overview of the processing sequence of a case where the stability factor is estimated by the vehicle control device 2 according to this first embodiment will be described. The following process is performed by being called at a predetermined interval at the time of controlling each unit when the vehicle 1 travels.

In a case where the stability factor is estimated when the vehicle 1 travels, first, calculation for estimating the weight of the vehicle 1 is performed (step ST101). This calculation is performed by the weight calculating unit 56 included in the processing unit 51 of the ECU 50. Here, describing a technique for calculating the weight, when the weight of the vehicle 1 is denoted by M, the acceleration of the vehicle 1 is denoted by a, the driving force of the vehicle 1 is denoted by Fd, the travel resistance of the vehicle 1 is denoted by Fr, and the acceleration of gravity is denoted by α, and the road grade is denoted by Θ, the equations of motion of the vehicle 1 in the forward/backward direction are the following Equations (19) and (20).

$$M \times a = Fd - Fr - Mg \sin \Theta \qquad (19)$$

$$M = (Fd - Fr)/(\alpha + g \sin \Theta) \qquad (20)$$

When the vehicle 1 travels, detection results acquired by the sensors are acquired by the traveling state acquiring unit 52 as the traveling state of the vehicle 1, by using this traveling state, the traveling state is calculated by the traveling state calculating unit 55 included in the processing unit 51 of the ECU 50, and the weight of the vehicle 1 is calculated by the weight calculating unit 56 by using the result of the calculation.

The traveling state calculating unit 55, for example, stores the relation among an engine output, the degree of opening of the throttle valve, and the rotation speed of the engine in the storage unit 70 of the ECU 50 in advance as a map, reads an engine output from the map in accordance with an input of a degree of the opening of the throttle valve and the rotation number of the engine, acquires an output for the driving wheels based on the transmission gear ratio of the power transmission device, and calculates a driving force Fd of the vehicle 1 in the driving wheels based on the effective radius of the vehicle wheels 5 and the like.

Here, the travel resistance Fr is a sum of frictional resistance that is not affected by the vehicle speed such as rolling resistance and air resistance that is substantially proportional to the square of the vehicle speed. Accordingly, the characteristic of the travel resistance Fr of the vehicle 1 is acquired in advance and is stored in the storage unit 70, and, in order to derive the travel resistance Fr, corresponding travel resistance Fr is derived using the detection result acquired by the vehicle speed sensor 41.

Here, more precisely, while the rolling resistance out of the travel resistance Fr depends on the weight of the vehicle 1, the rolling resistance can be estimated by setting a representative value (for example, an average of the weight of the vehicle 1, which varies, acquired through an experiment or the like) of the weight of the vehicle 1. In a case where the variation in the weight of the vehicle 1 is large, and an error due to the rolling resistance is large in the method of setting a representative value of the weight of the vehicle 1, it is preferable that the equations of motion are set such that the rolling resistance is a linear function of the weight M of the vehicle 1.

In addition, the acceleration $\alpha$ of the vehicle 1 is calculated by the traveling state calculating unit 55 as a derivative of the speed of the vehicle 1 that is detected by the vehicle speed sensor 41. The acceleration $\alpha$ may be acquired by using a different technique, and, for example, a forward/backward acceleration sensor (not illustrated in the figure) detecting the acceleration of the vehicle 1 in the forward/backward direction may be mounted in the vehicle 1, and the acceleration $\alpha$ may be acquired based on a detection result acquired by this forward/backward acceleration sensor.

In addition, in the ECU 50, a filter that eliminates noises overlapping signals representing the net driving force F calculated based on the detection result acquired by the vehicle speed sensor 41 or the like and the acceleration $\alpha$ calculated based on the detection result acquired by the vehicle speed sensor 41 may be included, and the noises included in the signals are eliminated by using this filter. For example, in the ECU 50, in order to suppress high-frequency noises overlapping in signals representing the net driving force F and the acceleration $\alpha$, a low pass filter that is a filter eliminating a band of a predetermined frequency or a higher frequency is included. When the traveling state of the vehicle 1 is calculated, by eliminating a band of a predetermined frequency or a higher frequency so as to suppress high-frequency noises from the signals appearing in the net driving force F and the acceleration $\alpha$ using this low-pass filter, equations of motion that are not influenced by high-frequency noises can be acquired. In addition, an appropriate value is set to the cut-off frequency of the low pass filter through an experiment or the like.

Furthermore, in the ECU 50, in order to suppress noises due to a torsional vibration of the rotation axis of the driving system that overlap the signals representing the net driving force F and the acceleration a, a notch filter that is a filter eliminating a predetermined frequency band is included. When the engine is driven, a torsional vibration is generated in the rotation axis of the driving system configured by the engine to the driving wheels, and this torsional vibration resonates when the rotation coincides with the natural frequency of the rotation axis and overlaps the signals representing the net driving force F and the acceleration $\alpha$ as noises. Accordingly, by using the notch filter that eliminates a predetermined frequency band matching the natural frequency of the rotation axis of this driving system, equations of motion that are not influenced by the vibration of the rotation axis of the driving system can be acquired. In addition, the frequency band that is eliminated by using the notch filter is set based on the characteristics (characteristics such as a torsional spring constant and moment of inertia) of the rotation axis of the driving system.

In addition, in the ECU 50, in order to eliminate noises generated due to changes in the grade of the road on which the vehicle 1 travels, a high pass filter that is a filter eliminating a band of a predetermined frequency or a lower frequency is included. In other words, while the road grade is not constant but generally changes, the change is a relatively gentle change, and the change in the road grade influences only a low frequency component of the acceleration $\alpha$. Accordingly, by eliminating signals of a predetermined frequency or a lower frequency from the signals representing the acceleration $\alpha$ and the net driving force F, equations of motion that are not influenced by the grade can be acquired even in a case where the grade in the road changes. In addition, by eliminating signals of a predetermined frequency or a lower frequency using a high pass filter, a DC component can be also eliminated, and accordingly, the influence of the road grade can be eliminated even when the road grade is constant. As a cut-off frequency of the high pass filter for eliminating the influence of the road grade, for example, about 1 Hz is set based on the change in the road grade that is defined in the Government Order on Road Design Standards. However, the cut-off frequency is not limited thereto, but an appropriate value may be set thereto through a traveling test or the like.

Furthermore, errors that cannot be eliminated by using the low-pass filter, the notch filter and the high-pass filter are sequentially eliminated by using a known method such as a least squares method, whereby the weight M of the vehicle 1 can be estimated. In this way, the traveling state of the vehicle 1 is calculated by the traveling state calculating unit 55 based on the detection result acquired by each sensor, and Equations (19) and (20) of the equations of motion are calculated by the weight calculating unit 56 using each value of the traveling state of the vehicle 1 from which noises have been eliminated by each filter, whereby the weight M of the vehicle 1 is estimated as an estimated weight.

Next, it is determined whether or not the weight estimating calculation has been completed (step ST102). This determination is made by the calculation state determining unit 57 included in the processing unit 51 of the ECU 50. The calculation state determining unit 57 determines whether or not the calculation for estimating the weight of the vehicle 1 has been completed by detecting the weight calculation state of the weight calculating unit 56.

In a case where it is determined that the weight estimating calculation has been completed in this determination (step ST102: Yes determination), next, a guard of the Kh estimated value is set in accordance with the weight estimated value (step ST103). The setting of the guard is performed by the guard setting unit 58 included in the processing unit 51 of the ECU 50. In the storage unit 70 of the ECU 50, the upper and lower limit guard 80 (see FIG. 9) of the Kh estimated value that is an estimated value calculated by the calculation operation for estimating the stability factor is stored. When the calculation operation for estimating the weight of the vehicle 1 is performed, the guard of the Kh estimated value is set based on the estimated weight of the vehicle 1 and the upper and lower limit guard 80 stored in the storage unit 70.

Describing the upper and lower limit guard 80, in the upper and lower limit guard 80, an upper limit value 81 and a lower limit value 82 of the Kh estimated value are set in accordance with the weight of the vehicle 1. Described in more detail, the upper limit value 81 of the upper and lower limit guard 80 is set to increase as the weight of the vehicle 1 increases, and the lower limit value 82 of the upper and lower limit guard 80 is set to decrease as the weight of the vehicle 1 increases. In other words, the upper and lower limit guard 80 of the Kh estimated value is set such that the upper limit value 81 and the lower limit value 82 are further separated from each other as the weight of the vehicle 1 increases and is stored in the storage unit 70.

The setting of the upper and lower limit guard 80 of the Kh estimated value, for example, is performed by measuring the relation between the weight of the vehicle 1 and the stability factor in advance and forming the relation as a map, and the upper and lower limit guard 80 that is formed as the map is stored in the storage unit 70. In addition, in the storage unit 70 of the ECU 50, a fixed weight GVW that is a fixed value of the weight used in a case where the calculation operation for estimating the weight of the vehicle 1 has not been completed and is a value of the weight set in advance is stored. Regarding this fixed weight GVW, for example, a weight at the time of a maximum loading capacity of the vehicle 1 is set as the fixed weight GVW.

The guard setting unit 58 compares the estimated weight of the vehicle 1 that has been calculated by the weight calculating unit 56 with the map of the upper and lower limit guard 80 stored in the storage unit 70 and sets the upper and lower limit guard 80 of the Kh estimated value according to the estimated weight. In other words, the guard of the Kh estimated value is set by setting the upper limit value 81 and the lower limit value 82 of the Kh estimated value based on the estimated weight calculated by the weight calculating unit 56 and the upper and lower limit guard 80 stored in the storage unit 70. For example, in a case where PW is calculated as the estimated weight, the setting of the guard is performed such that a range between the upper limit value 81 and the lower limit value 82 of a case where the estimated weight is PW is set as a set guard range 83 that is a guard range of the Kh estimated value for the estimated weight. In this way, the guard setting unit 58 changes and sets the upper and lower limit values of the Kh estimated value based on the result of the calculation of the weight of the vehicle 1.

On the other hand, in a case where it is determined that the weight estimation calculation has not been completed as the determination made by the calculation state determining unit 57 (step ST102: No determination), next, the guard setting of the fixed value of the Kh estimated value is performed by the guard setting unit 58 (step ST104). Described in more detail, in a case where it is determined that the weight estimation calculation has not been completed by the calculation state determining unit 57, the guard setting unit 58 sets the fixed weight GVW as the weight of the vehicle 1 and performs guard setting of the Kh estimated value based on the fixed weight GVW and the upper and lower limit guard 80. In other words, the upper limit value 81 and the lower limit value 82 of the Kh estimated value of a case where the weight of the vehicle 1 is the fixed weight GVW are set as the upper and lower limit values of the Kh estimated value. In other words, the guard setting is performed such that a range between the upper limit value 81 and the lower limit value 82 of a case where the estimated weight is the fixed weight GVW is set as a fixed guard range 84 that is a guard range of the Kh estimated value for the fixed weight GVW.

Since this fixed weight GVW has a fixed value, the upper and lower limit guard 80 that is set by using the fixed weight GVW has fixed values. Accordingly, in other words, in a case where it is determined that the estimation of the weight of the vehicle 1 has not been completed by the weight calculating unit 56 when the upper and lower limit guard 80 is set, the guard setting unit 58 sets the guard of the Kh estimated value as the fixed value by setting the fixed value determined in advance as the upper and lower limit guard 80.

When the guard setting of the Kh estimated value is performed by the guard setting unit 58 (steps ST103 and ST104), next, a process of calculating a Kh estimated value is performed (step ST105). The process of calculating the Kh estimated value is performed by the traveling state calculating unit 55. The traveling state calculating unit 55 performs the calculation process of the above-described Equations (1) to (18) by using information of the estimated weight of the vehicle 1 calculated by the weight calculating unit 56 or the fixed weight GVW and the traveling state such as the vehicle speed and the yaw rate acquired by the traveling state acquiring unit 52. Accordingly, the process of calculating the Kh estimated value, in other words, the estimated value Khp of the stability factor is performed, and the traveling state calculating unit 55 calculates the Kh estimated value by calculating the estimated value Khp of the stability factor and estimates the turning characteristic of the vehicle 1.

Next, a process of guarding the Kh estimated value is performed (step ST106). This guarding process is performed by the upper and lower limit processing unit 59 based on the upper and lower limit guard 80 set by the guard setting unit 58. Described in more detail, in a case where the Kh estimated value calculated by the traveling state calculating unit 55 is outside the range of the upper and lower limit guard 80 set by the guard setting unit 58, in other words, outside the set guard range 83 or the fixed guard range 84, the Kh estimated value is set as the value of the upper and lower limit guard 80 by the upper and lower limit processing unit 59.

In other words, in a case where the Kh estimated value calculated by the traveling state calculating unit 55 is larger than the upper limit value 81 of the upper and lower limit guard 80, the value of the Kh estimated value is set as the upper limit value 81 of the upper and lower limit guard 80 by the upper and lower limit processing unit 59. On the other hand, in a case where the calculated Kh estimated value is smaller than the lower limit value 82 of the upper and lower limit guard 80, the value of the Kh estimated value is set as the lower limit value 82 of the upper and lower limit guard 80 by the upper and lower limit processing unit 59. In other words, in a case where the Kh estimated value is outside the set guard range 83 or outside the fixed guard range 84, the Kh estimated value is reset. Accordingly, the Kh estimated value is configured to be in the range of the upper and lower limit guard 80.

When the Kh estimated value is within the range of the upper and lower limit guard 80, in other words, within the set guard range 83 or the fixed guard range 84, the process exits from this process sequence, behavior control of the vehicle 1 is performed using the Kh estimated value by the behavior control unit 54. In other words, based on the Kh estimated value after the process of putting the Kh estimated value within the range of the upper and lower limit values by using the upper and lower limit processing unit 59, the behavior control of the vehicle 1 is performed by the behavior control unit 54. Accordingly, the behavior control of the vehicle 1 is performed while a control amount at the time of performing the behavior control is maintained to be in a predetermined range.

In the vehicle control device 2 according to the first embodiment described above, the upper and lower limit guard 80 of the Kh estimated value is set based on the weight of the vehicle 1 that is estimated by the weight calculating unit 56, and the Kh estimated value estimated by the traveling state calculating unit 55 is put into the range of the upper and lower limit guard 80 by the upper and lower limit processing unit 59. Accordingly, the range of an estimated value at the time of estimating the stability factor based on the traveling state of the vehicle 1 and the like can be limited. As a result, the estimation accuracy of the estimated value of the stability factor can be improved.

In addition, as above, by limiting the range of the Kh estimated value at the time of estimating the stability factor and improving the estimation accuracy of the stability factor, the Kh estimated value can be put into a predetermined range even in a case where erroneous detection is performed by each sensor. As a result, since the control amount at the time of performing the behavior control of the vehicle 1 can be put into a predetermined range, appropriate behavior control can be performed, and the stability can be reliably secured when the vehicle 1 travels.

In addition, when the upper and lower limit guard 80 is set, in a case where the estimation of the weight of the vehicle 1 has not been completed, the guard setting unit 58 sets the fixed weight GVW to the weight of the vehicle 1, thereby setting the upper and lower limit guard 80 to fixed values. Accordingly even in a case where the estimation of the weight of the vehicle 1 has not been completed, the range of the Kh estimated value at the time of estimating the stability factor can be limited, whereby the estimation accuracy of the stability factor can be assuredly improved.

[Second Embodiment]

While a vehicle control device 2 according to a second embodiment has almost the same configuration as the vehicle control device 2 according to the first embodiment, there is a feature that the guarding process is performed for the estimated value of the weight of the vehicle 1. The other configurations are the same as those of the first embodiment, and thus description thereof will not be presented with the same reference signs being respectively assigned thereto.

The vehicle control device 2 according to the second embodiment, similarly to the vehicle control device 2 according to the first embodiment, can perform the behavior control at a time when the vehicle 1 travels by using an ECU 50 mounted in the vehicle 1. When the behavior control at the time when the vehicle 1 travels is performed based on the state of the vehicle 1, the vehicle control device 2 according to the second embodiment, differently from the vehicle control device 2 according to the first embodiment, performs the guarding process for an estimated value of the weight of the vehicle 1. In other words, in the behavior control at the time when the vehicle 1 travels, in order to calculate a control amount including the weight of the vehicle 1, the vehicle control device 2 according to this second embodiment performs the guarding process for an estimated value of the weight so as to maintain the control amount at the time of performing the behavior control to be in a predetermined range by improving the estimation accuracy of the weight.

Accordingly, in the vehicle control device 2 according to this second embodiment, a guard setting unit 58 changes and sets at least one of the upper limit value and the lower limit value of the weight of the vehicle 1 based on the turning characteristic of the vehicle 1 that is estimated by a traveling state calculating unit 55, and an upper and lower limit processing unit 59 performs a process of putting the weight estimated by the weight calculating unit 56 into the range of the upper and lower limit values set by the guard setting unit 58.

Figure 11:
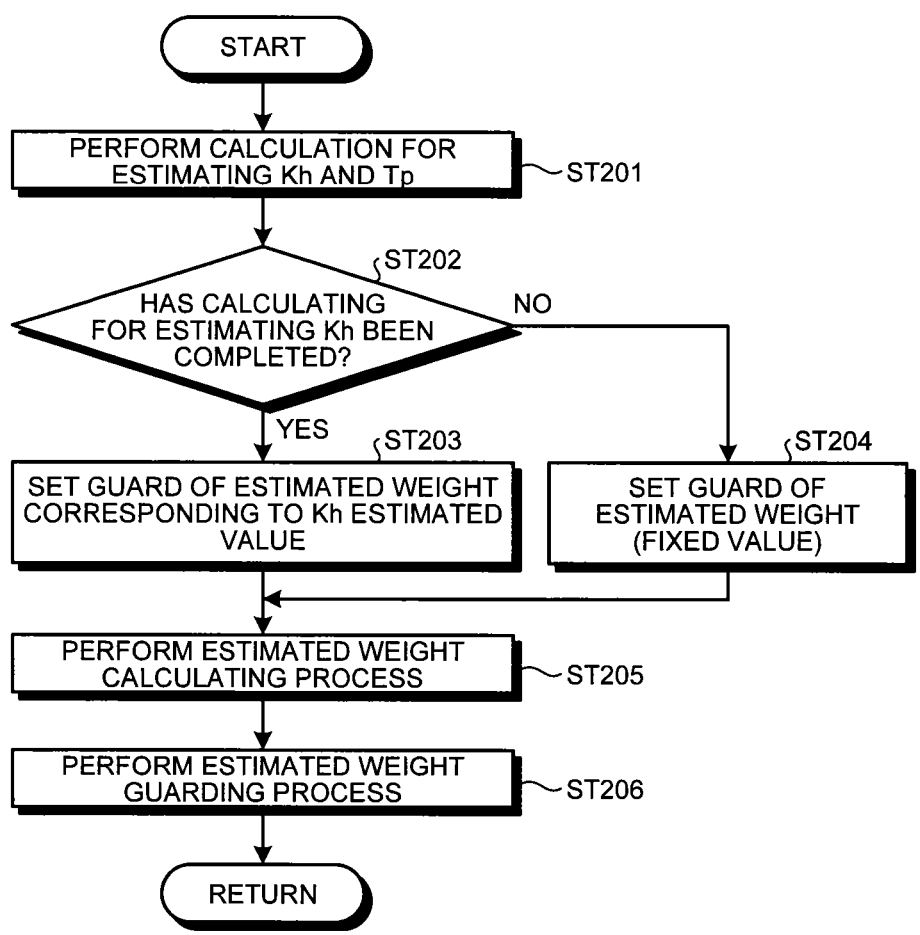
FIG. 11 is a flowchart that illustrates a flow at the time of estimating the weight of the vehicle by using a vehicle control device according to a second embodiment.

FIG. 11 is a flowchart that illustrates a flow at the time of estimating the weight of the vehicle by using the vehicle control device according to the second embodiment. An overview of the processing sequence in a case where the weight of the vehicle 1 is estimated at the time of performing the behavior control of the vehicle control device 2 according to this second embodiment will be described. When the weight at the time when the vehicle 1 travels is estimated, first, calculation for estimating the stability factor Kh and the steering response time constant coefficient Tp is performed (step ST201). This calculation process is performed by the traveling state calculating unit 55 included in a processing unit 51 of the ECU 50 using the above-described Equations (1) to (18). Here, in the above-described Equations (1) to (18), while the stability factor Kh and the steering response time constant coefficient Tp are calculated using the weight M of the vehicle 1, in this calculation process, the weight of the vehicle 1 in a state in which persons corresponding to a maximum number of regular personnel get in the vehicle so as to carry a maximum loading capacity amount is used as the weight M. Accordingly, the traveling state calculating unit 55 estimates the stability factor Kh and the steering response time constant coefficient Tp.

Next, it is determined whether or not the calculation for estimating the stability factor Kh has been completed (step ST202). This determination is made by the calculation state determining unit 57. The calculation state determining unit 57 determines whether or not this calculation has been completed by detecting the estimation calculation state of the stability factor Kh in the weight calculating unit 56.

In a case where it is determined that the estimation calculation of the stability factor Kh has been completed in this determination (step ST202: Yes determination), next, a guard of the estimated weight is set by a guard setting unit 58 (step ST203). The setting of the guard is performed by the guard setting unit 58 based on the relation between the estimated weight stored in the storage unit 70 of the ECU 50 and the Kh estimated value and the relation between the estimated weight and a Tp estimated value that is an estimated value of the steering response time constant coefficient Tp.

Figure 12:
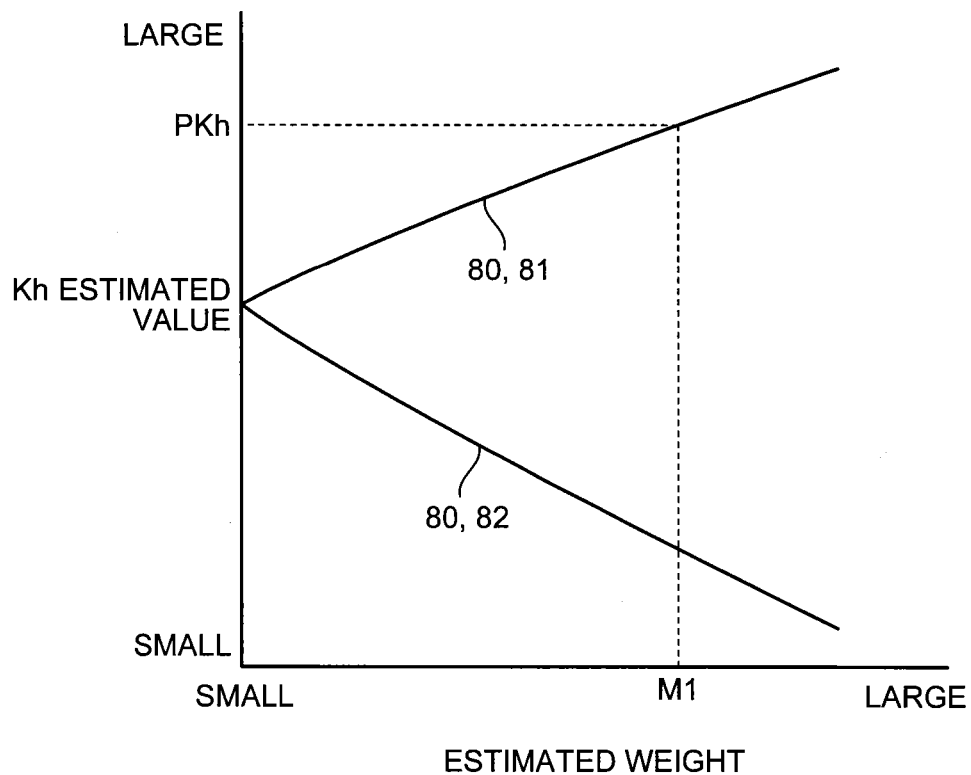
FIG. 12 is an explanatory diagram at the time of setting a guard of an estimated weight using the stability factor.

FIG. 12 is an explanatory diagram at the time of setting a guard of the estimated weight using the stability factor. In the storage unit 70 of the ECU 50, the upper and lower limit guard 80 of the Kh estimated value for the estimated weight is stored as a map, and the map is used in the setting of a guard of the estimated weight using the Kh estimated value. Described in more detail, an estimated weight corresponding to the Kh estimated value calculated by the traveling state calculating unit 55 at the upper limit value 81 of the upper and lower limit guard 80 is set as a weight M1. In other words, an estimated weight at the intersection of the upper limit value 81 of the upper and lower limit guard 80 in the map of the upper and lower limit guard 80 stored in the storage unit 70 and the calculated Kh estimated value is set as the weight M1 by the guard setting unit 58. For example, in a case where PKh is calculated as the Kh estimated value, an estimated weight for which the Kh estimated value is PKh at the upper limit value 81 of the upper and lower limit guard 80 is set as the weight M1.

Figure 13:
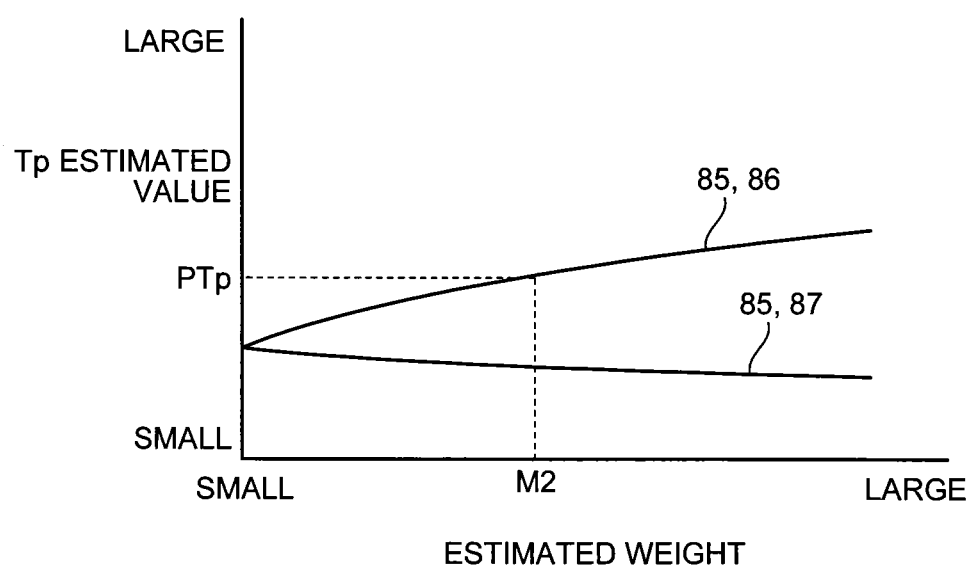
FIG. 13 is an explanatory diagram at the time of setting a guard of an estimated weight using a steering response time constant coefficient.

FIG. 13 is an explanatory diagram at the time of setting a guard of the estimated weight using the steering response time constant coefficient. In the storage unit 70 of the ECU 50, an upper and lower limit guard 85 of the Tp estimated value for the estimated weight is stored as a map, and the guard setting unit 58 performs the setting of the guard of the estimated weight using the upper and lower limit guard 85 of the Tp estimated value as well. Described in more detail, the upper and lower limit guard 85 of the Tp estimated value, similarly to the upper and lower limit guard 80 of the Kh estimated value, has an upper limit value 86 and a lower limit value 87 and is set such that the upper limit value 86 increases as the estimated weight increases, and the lower limit value 87 decreases as the estimated weight increases.

The guard setting unit 58 sets an estimated weight corresponding to the Tp estimated value calculated by the traveling state calculating unit 55 at the upper limit value 86 of the upper and lower limit guard 85 of the Tp estimated value stored in the storage unit 70, as a weight M2. In other words, the guard setting unit 58 sets an estimated weight at the intersection of the upper limit value 86 of the upper and lower limit guard 85 in the map of the upper and lower limit guard 80 of the Tp estimated value stored in the storage unit 70 and the calculated Tp estimated value as the weight M2. For example, in a case where PTp is calculated as the Tp estimated value, an estimated weight for which the Tp estimated value is the PTp at the upper limit value 86 of the upper and lower limit guard 85 is set as the weight M2.

The guard setting unit 58 that has set the weights M1 and M2 in this way performs the setting of a guard of the estimated weight in accordance with the weights M1 and M2. In other words, the setting of a guard is performed by setting the weights M1 to M2 as the guard range of the estimated weight with, out of the weights M1 and M2, one being set as the upper limit value of the estimated weight and the other being set as the lower limit value thereof.

On the other hand, in a case where it is determined that the estimation calculation of the stability factor Kh has not been completed as the determination made by the calculation state determining unit 57 (step ST202; No determination), next, the setting of a guard of the fixed value of the estimated weight is performed by the guard setting unit 58 (step ST204). Described in more detail, in a case where it is determined that the estimation calculation of the stability factor Kh has not been completed by the calculation state determining unit 57, the guard setting unit 58 uses the fixed weight GVW for the setting of a guard of the estimated weight. In such a case, the guard setting unit 58 performs the guard setting with the weight of the vehicle 1 at the time when two passengers get therein to the fixed weight GVW being set as the guard range of the estimated weight.

In other words, the guard setting unit 58 performs the guard setting by setting the weight of the vehicle 1 at the time when two passengers get therein to the fixed weight GVW as the range of the estimated weight with the weight of the vehicle 1 at the time when two passengers get therein being set as the upper limit value of the estimated weight and the fixed weight GVW being set as the lower limit value thereof. Thus, in other words, in a case where it is determined that the estimation calculation of the stability factor Kh has not been completed when the guard of the estimated weight is set, the guard setting unit 58 sets the guard of the estimated weight at the fixed value.

When the setting of the guard of the estimated weight is performed by the guard setting unit 58 (steps ST203 and ST204), next, the process of calculating the estimated weight is performed (step ST205). The process of calculating the estimated weight is performed by the weight calculating unit 56. The weight calculating unit 56 calculates the estimated weight by calculating Equations (19) and (20) of the equations of motion by using the traveling state of the vehicle 1 that is calculated by the traveling state calculating unit 55.

Next, the process of guarding the estimated weight is performed (step ST206). This guarding process is performed by the upper and lower limit processing unit 59 based on the guard range of the estimated weight set by the guard setting unit 58. Described in more detail, in a case where the estimated weight calculated by the weight calculating unit 56 is outside the guard range set by the guard setting unit 58, the estimated weight is reset by the upper and lower limit processing unit 59, and the estimated weight is set as a value within the guard range.

In other words, in a case where the estimated weight calculated by the weight calculating unit 56 is larger than a larger one of the weights M1 and M2 or the fixed weight GVW, the value of the larger one of the weights M1 and M2 or the value of the fixed weight GVW is set as the value of the estimated weight by the upper and lower limit processing unit 59. On the other hand, in a case where the estimated weight calculated by the weight calculating unit 56 is smaller than a smaller one of the weights M1 and M2 or the weight of the vehicle 1 at the time when two persons get therein, the value of the smaller one of the weights M1 and M2 or the value of the weight at the time when two persons get therein is set as the value of the estimated weight by the upper and lower limit processing unit 59. Accordingly, the estimated weight is set as a value within the guard range of the estimated weight.

When the estimated weight is set as the value within the guard range, the process exits from this processing sequence, and the behavior control of the vehicle 1 is performed using the estimated weight by the behavior control unit 54. In other words, based on the estimated weight after the process of putting the estimated weight into the range of the upper and lower limit values that is performed by the upper and lower limit processing unit 59, the behavior control of the vehicle 1 is performed by the behavior control unit 54. Accordingly, the behavior control of the vehicle 1 is performed with the control amount at the time of performing the behavior control being maintained within a predetermined range.

The vehicle control device 2 according to the second embodiment described above sets the guard range of the estimated weight based on the Kh estimated value and the Tp estimated value calculated by the traveling state calculating unit 55 and puts the estimated weight calculated by the weight calculating unit 56 within the guard range of the estimated weight by using the upper and lower limit processing unit 59. Accordingly, the range of the estimated weight at the time of estimating the weight of the vehicle 1 based on the traveling state of the vehicle 1 or the like can be limited. As a result, the estimation accuracy of the weight of the vehicle 1 can be improved.

In addition, by improving the estimation accuracy of the weight of the vehicle 1 by limiting the range of the estimated weight as above, even in a case where erroneous detection is made by each sensor, the estimated weight can be put into a predetermined range. As a result, since the control amount at the time of performing the behavior control of the vehicle 1 can be put into the predetermined range, appropriate behavior control can be performed, whereby the stability at the time when the vehicle 1 travels can be reliably secured.

Furthermore, in a case where the estimation of the stability factor Kh has not been completed when the guard range of the estimated weight is set, the guard setting unit 58 uses the weight of the vehicle 1 at the time when two persons get therein and the fixed weight GVW, whereby the guard range of the estimated weight is set to a fixed value. Accordingly, even in a case where the estimation of the stability factor Kh has not been completed, the range of the estimated weight can be limited, whereby the estimation accuracy of the weight of the vehicle 1 can be improved more reliably.

[Third Embodiment]

While a vehicle control device 2 according to a third embodiment has almost the same configuration as the vehicle control device 2 according to the first embodiment, there is a feature that it is determined whether or not an acquired value is reliable based on the correlation information of the estimated weight of the vehicle 1 and estimated values of the stability factor and the steering response time constant coefficient. The other configurations are the same as those of the first embodiment, and thus description thereof will not be presented with the same reference signs being respectively assigned thereto.

Figure 14:
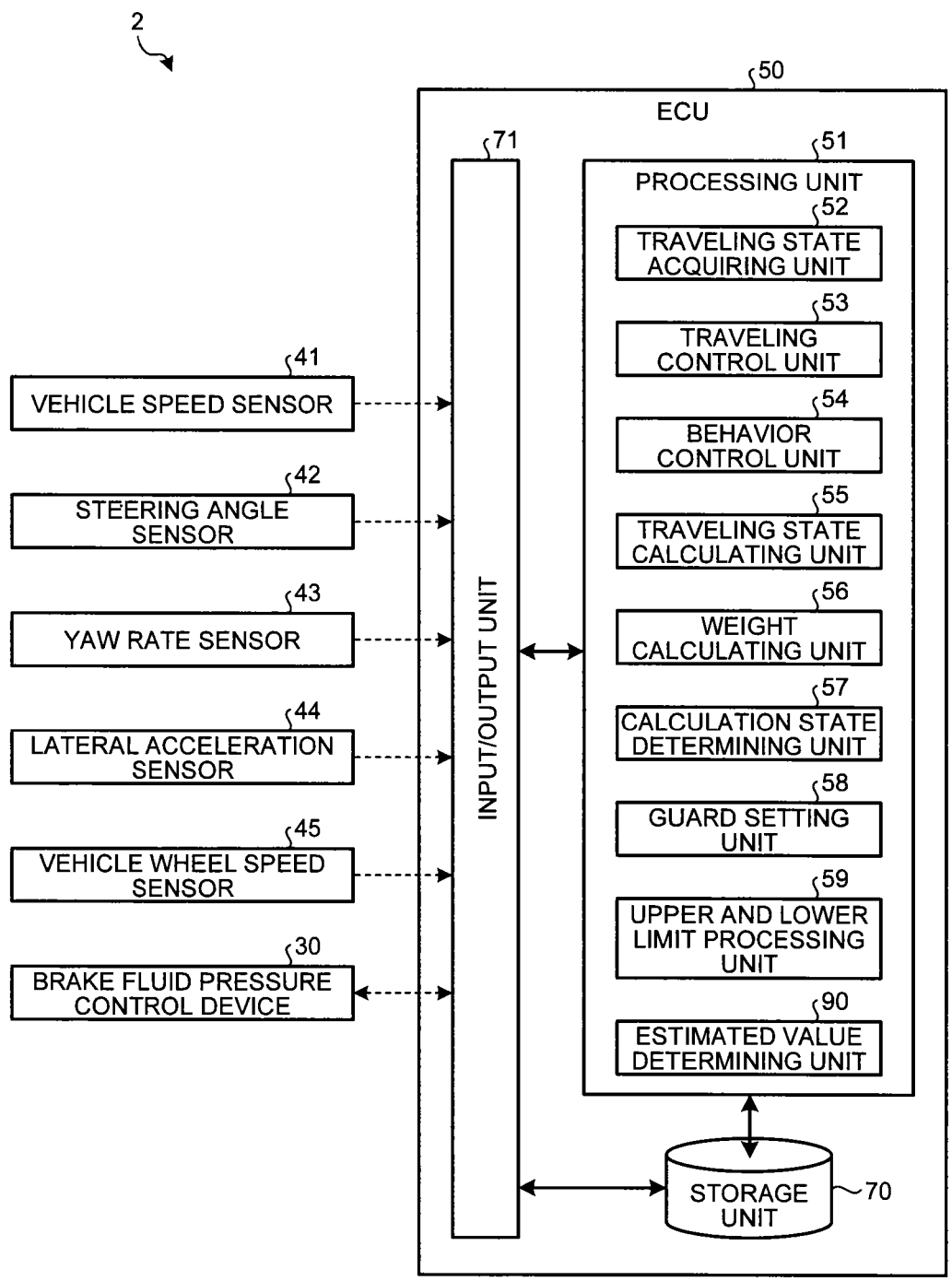
FIG. 14 is a configuration diagram of a main portion of a vehicle control device according to a third embodiment.

FIG. 14 is a configuration diagram of a main portion of the vehicle control device according to the third embodiment. The vehicle control device 2 according to the third embodiment, similarly to the vehicle control device 2 according to the first embodiment, is configured to perform behavior control at the time when the vehicle 1 travels by using an ECU 50 mounted in the vehicle 1. In addition, in the vehicle control device 2 according to this third embodiment, when the behavior control at the time when the vehicle 1 travels is performed based on the state or the characteristic of the vehicle 1, the reliability of the estimated values is determined based on the correlation information of the estimated weight of the vehicle 1 and the estimated values of the stability factor Kh and the steering response time constant coefficient Tp. Then, in a case where the estimated values are not reliable, the estimated values are discarded. Accordingly, the processing unit 51 of the ECU 50 included in the vehicle control device 2 according to this third embodiment includes an estimated value determining unit 90 that determines the correlation of the estimated values.

In other words, in the behavior control at the time when the vehicle 1 travels, the control amount is calculated by using such estimated values, and accordingly, in a case where the control amount is calculated using estimated values that are not reliable, it is difficult to acquire an appropriate control amount. Accordingly, in the vehicle control device 2 according to this third embodiment, the correlation of the estimated values is determined by the estimated value determining unit 90, and a calculated estimated value is discarded in a case where the estimated value used for the behavior control is not reliable.

Figure 15:
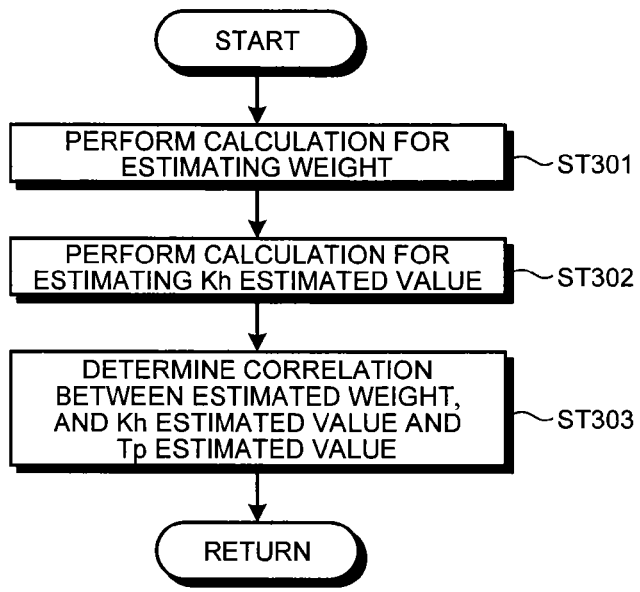
FIG. 15 is a flowchart that illustrates a flow at the time of calculating estimated values used for behavior control by the vehicle control device according to the third embodiment.

FIG. 15 is a flowchart that illustrates a flow at the time of calculating estimated values used for behavior control by the vehicle control device according to the third embodiment. An overview of the processing sequence at the time of calculating estimated values of the state or the characteristic of the vehicle 1 when the behavior control of the vehicle control device 2 according to this third embodiment is performed will be described. In the vehicle control device 2 according to this third embodiment, as estimated values used for the calculation of the control amount at the time of performing behavior control, the weight of the vehicle 1, the stability factor Kh, and the steering response time constant coefficient Tp are estimated. As the sequence for estimating such estimated values, by using the sequence for estimating the stability factor using the vehicle control device 2 according to the first embodiment and the sequence for estimating the weight of the vehicle 1 using the vehicle control device 2 according to the second embodiment, the estimation can be performed in any order, and accordingly, the estimation sequences may be arranged in any order. In the following description, it is assumed that the weight of the vehicle 1 is estimated first.

In this processing sequence, first, the calculation for estimating the weight of the vehicle 1 is performed by the weight calculating unit 56 (step ST301). In other words, the weight calculating unit 56 calculates an estimated weight of the vehicle 1 by calculating Equations (19) and (20) of the equations of motion described above using the traveling state of the vehicle 1 that is calculated by the traveling state calculating unit 55.

Next, the calculation for estimating the stability factor Kh and the steering response time constant coefficient Tp is performed by the traveling state calculating unit 55 (step ST302). The traveling state calculating unit 55 calculates a Kh estimated value and a Tp estimated value by performing the calculation process of Equations (1) to (18) described above by using information of the estimated weight of the vehicle 1 calculated by the weight calculating unit 56 and the traveling state of the vehicle 1 acquired by the traveling state acquiring unit 52.

Next, the correlation between the estimated weight, and the Kh estimated value and the Tp estimated value is determined (step ST303). This determination of the correlation is made by the estimated value determining unit 90 that is included in the processing unit 51 of the ECU 50.

Figure 16:
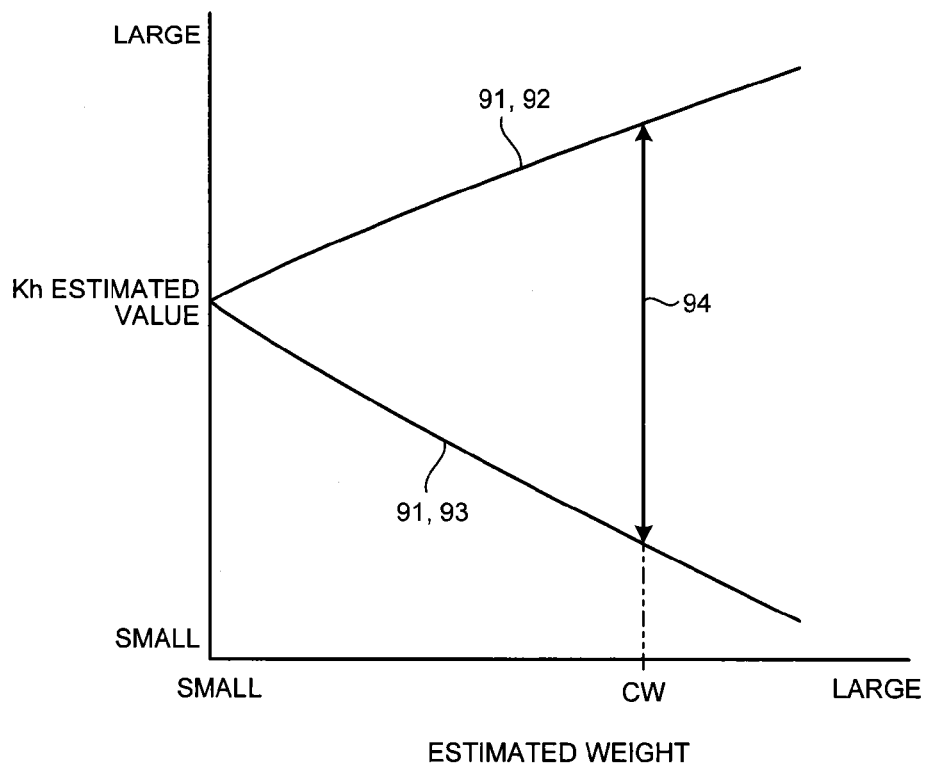
FIG. 16 is an explanatory diagram that illustrates a range at the time of making a determination of correlation of estimated values.

FIG. 16 is an explanatory diagram that illustrates a range at the time of making a determination of correlation of estimated values. In the determination of the correlation of estimated values that is made by the estimated value determining unit 90, a range of the determination of correlation between the Kh estimated value and the estimated weight is set, and it is determined whether to discard the estimated values based on the range of the correlation determination. More specifically, the range of the Kh estimated value that is reliable for an estimated weight of the vehicle 1 is measured in advance, is formed as a map, and is stored in the storage unit 70 of the ECU 50, and the correlation determination is made by comparing the estimated weight of the vehicle 1 and the Kh estimated value with the map.

For example, as illustrated in FIG. 16, an upper limit value 92 and a lower limit value 93 of the Kh estimated value for an estimated weight are set in advance, and a correlation determination range 91 is set such that the upper limit value 92 increases as the estimated weight increases, and the lower limit value 93 increases as the estimated weight increases. The estimated value determining unit 90 compares the Kh estimated value and the estimated weight with the correlation determination range 91 and determines whether or not the Kh estimated value is positioned between the upper limit value 92 and the lower limit value 93 of the correlation determination range 91 that corresponds to the estimated weight. For example, in a case where CW is calculated as the estimated weight, a range between the upper limit value 92 and the lower limit value 93 of the correlation determination range 91 of a case where the estimated weight is CW is set as a determination range 94, and it is determined whether or not the Kh estimated value is positioned in this determination range 94.

In a case where the Kh estimated value is positioned between the upper limit value 92 and the lower limit value 93 of the correlation determination range 91 that corresponds to the estimated weight as the determination, in other words, positioned in the determination range 94, it is determined that the estimated weight, the Kh estimated value, and the Tp estimated value are reliable. In such a case, the behavior control of the vehicle 1 is performed using the estimated values.

On the other hand, in a case where the Kh estimated value is not positioned in the determination range 94, in other words, in a case where the Kh estimated value is larger than the upper limit value 92 of the correlation determination range 91 corresponding to the estimated weight or is smaller than the lower limit value 93 thereof, it is determined that the estimated weight, the Kh estimated value, and the Tp estimated value are not reliable. In such a case, all the estimated values are discarded and are reset. In a case where the all the estimated values are discarded, for example, the behavior control of the vehicle 1 is performed using a fixed value set in advance, for example, the fixed weight GVW or the like. In such a case, the fixed value used for the behavior control of the vehicle 1 may be a value other than the fixed weight GVW. In addition, a fixed value of the turning characteristic of the vehicle 1 such as the stability factor Kh or the steering response time constant coefficient Tp may be set in advance, and the behavior control of the vehicle 1 may be performed using the fixed value of the turning characteristic.

In addition, in a case where all the estimated values are discarded, the process may be returned to step ST301 so as to repeat the sequence for calculating estimated values of the state or the characteristic of the vehicle 1 again.

According to the vehicle control device 2 of the third embodiment described above, when estimated values of the state or the characteristic of the vehicle 1 such as the estimated weight and the Kh estimated value are calculated, the correlation of the estimated values is determined, and, in a case where the estimated values are determined not to be reliable through this correlation determination process, the estimated values are discarded. As a result, the calculation of estimated values deviating from actual values can be suppressed, whereby the estimation accuracy of estimated values of the state or the characteristic of the vehicle 1 can be improved.

In addition, the determination of the correlation of estimated values is made as above, and the estimated values are discarded in a case where the estimated values are determined not to be reliable, whereby the calculation of the control amount of the behavior control using estimated values calculated based on erroneous detection can be suppressed even in a case where the erroneous detection is performed by each sensor. As a result, more appropriate behavior control can be performed, and accordingly, the stability at the time when the vehicle 1 travels can be reliably secured.

[Fourth Embodiment]

While a vehicle control device 2 according to a fourth embodiment has almost the same configuration as the vehicle control device 2 according to the third embodiment, there is a feature that the level of the reliability is also determined when the reliability of estimated values is determined. The other configurations are the same as those of the third embodiment, and thus description thereof will not be presented with the same reference signs being respectively assigned thereto.

Figure 17:
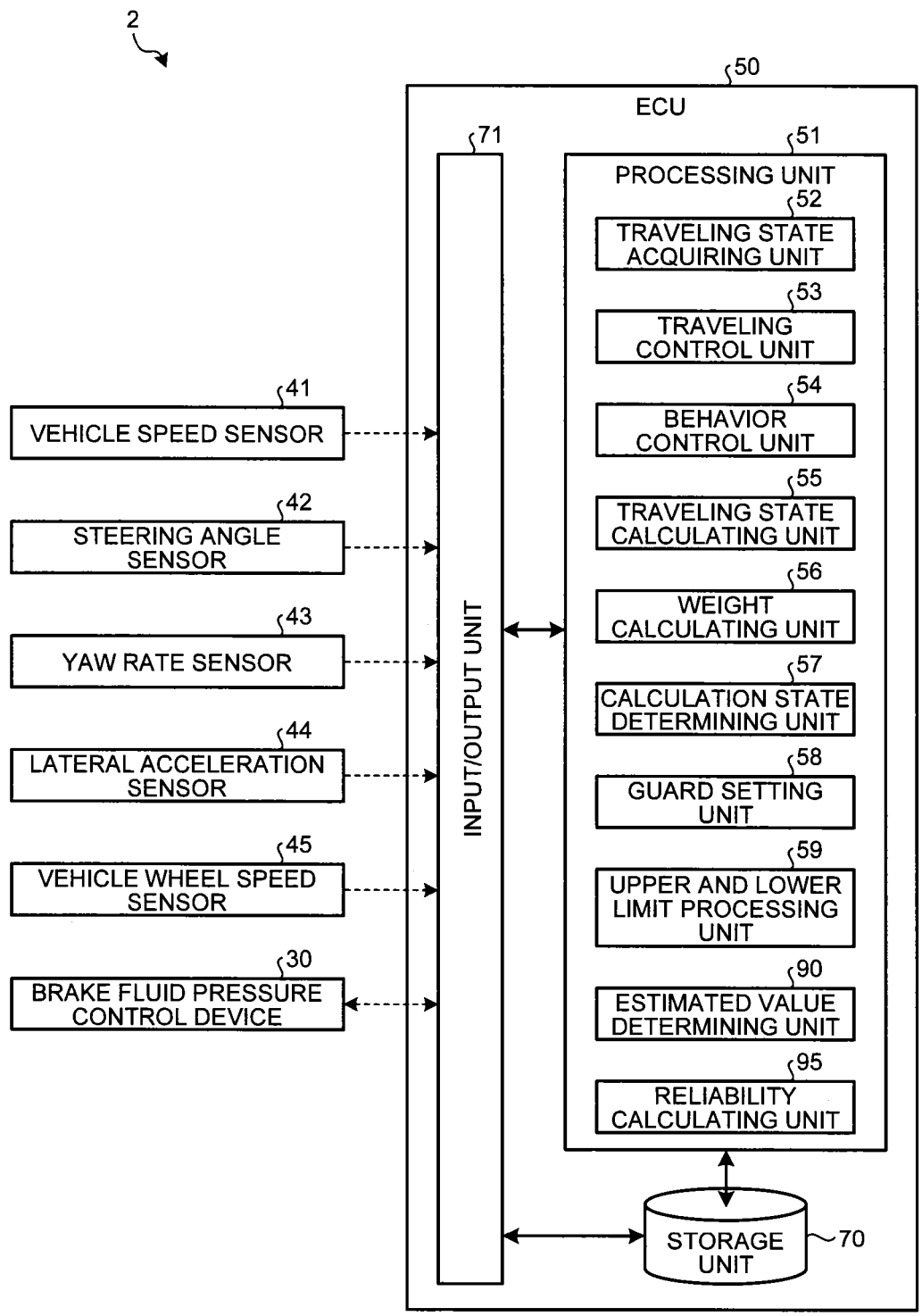
FIG. 17 is a configuration diagram of a main portion of a vehicle control device according to a fourth embodiment.

FIG. 17 is a configuration diagram of a main portion of the vehicle control device according to the fourth embodiment. The vehicle control device 2 according to the fourth embodiment, similarly to the vehicle control device 2 according to the third embodiment, is configured to perform behavior control at a time when the vehicle 1 travels, and, by determining the correlation of estimated values of the state or the characteristic of the vehicle 1 used for calculating the control amount of the behavior control, the reliability of the estimated values can be determined. In addition, according to the vehicle control device 2 of this fourth embodiment, the reliability levels of the estimated values are also determined, and an estimated value having a low reliability level is discarded. Accordingly, a processing unit 51 of an ECU 50 included in the vehicle control device 2 according to this fourth embodiment includes a reliability calculating unit 95 that calculates the reliability levels of estimated values.

In other word, the estimated value of the state or the characteristic of the vehicle 1 has a reliability level that changes in accordance with the status at the time of estimating the estimated value, and accordingly, when the reliability of the estimated values are determined, the level of the reliability is determined as well, and an estimated value having a low reliability level is discarded.

FIG. 18 is a flowchart at the time of calculating estimated values used for behavior control by using the vehicle control device according to the fourth embodiment. An overview of the processing sequence at the time of calculating estimated values of the state or the characteristic of the vehicle 1 when behavior control is performed by the vehicle control device 2 according to this fourth embodiment will be described. When estimated values of the state or the characteristic of the vehicle 1 are calculated by the vehicle control device 2 according to this fourth embodiment, similarly to the vehicle control device 2 according to the third embodiment, first, calculation for estimating the weight of the vehicle 1 is performed by the weight calculating unit 56 (step ST401).

Next, the reliability level of the weight estimated value is calculated (step ST402). The calculation process of the reliability level is performed by the reliability calculating unit 95 included in the processing unit 51 of the ECU 50. The reliability calculating unit 95 calculates a reliability level of an estimated value based on the traveling state of the vehicle 1. More specifically, as the reliability level of the estimated value of the state or the characteristic of the vehicle 1, the reliability level for each traveling state of the vehicle 1 is measured in advance, is formed as a map, and is stored in the storage unit 70 of the ECU 50. The reliability calculating unit 95 calculates a reliability level of an estimated value by referring to this map using the current traveling state of the vehicle 1.

FIG. 19 is a table that represents the relation between the traveling state of a vehicle and an estimated value. As the traveling states of the vehicle 1 that are used for determining the reliability levels of estimated values, for example, there are forward/backward acceleration, lateral acceleration, a yaw rate, and a vehicle speed. The trends of changes in the reliability level with respect to the traveling state of the vehicle 1 will now be described. When the forward/backward acceleration is generated, the reliability level of the Kh estimated value is low, and the reliability level of the estimated weight is high. In addition, when the lateral acceleration is generated, the reliability level of the Kh estimated value is high, and the reliability level of the estimated weight is low. Furthermore, when the yaw rate is generated, the reliability level of the Kh estimated value is high, and the reliability level of the estimated weight is low. In addition, in a case where the vehicle speed is in a low-speed zone or a very high-speed zone, the reliability level of the Kh estimated value is low, and, in a case where the vehicle speed is in a low-speed zone, the reliability level of the estimated weight is high.

In the storage unit 70 of the ECU 50, a map in which the reliability levels are set in such trends is stored. The reliability calculating unit 95 calculates the reliability level of an estimated weight calculated by the weight calculating unit 56 by referring to this map using the information of the traveling state of the vehicle 1 that is acquired by the traveling state acquiring unit 52.

In other words, since the reliability level differs for each type of traveling state of the vehicle 1, the reliability calculating unit 95 calculates the reliability level by integrating the reliability levels for the types of traveling state and digitizing the level of the reliability. For example, a low reliability level is set as "0", a high reliability level is set as "1", and a reliability level of an estimated weight is calculated as being between 0 to 1.

When the reliability level of the estimated weight is calculated, next, calculation for estimating the stability factor Kh and the steering response time constant coefficient Tp is performed by the traveling state calculating unit 55 (step ST403).

Next, the reliability level of the Kh estimated value is calculated by the reliability calculating unit 95 (step ST404). The reliability calculating unit 95, similarly to the case where the reliability level of the estimated weight is calculated, calculates a reliability level of the Kh estimated value calculated by the traveling state calculating unit 55 by referring to the map stored in the storage unit 70 of the ECU 50 by using the information of the traveling state of the vehicle 1 that is acquired by the traveling state acquiring unit 52. In other words, the reliability level of the Kh estimated value is calculated as being between 0 to 1.

Next, the correlation between the estimated weight, and the Kh estimated value and the Tp estimated value is performed by the estimated value determining unit 90 (step ST405). The estimated value determining unit 90, similarly to the case where the correlation determination is made by the vehicle control device 2 according to the third embodiment, determines correlation by comparing the estimated weight of the vehicle 1 and the Kh estimated value with the map of the correlation determination range 91 that is stored in the storage unit 70 of the ECU 50.

As above, the correlation is determined by comparing the Kh estimated value and the estimated weight with the correlation determination range 91, and, in a case where it is determined that the estimated values are determined to be reliable, the behavior control of the vehicle 1 is performed using such estimated values.

On the other hand, in a case where the Kh estimated value is larger than the upper limit value 92 of the correlation determination range 91 corresponding to the estimated weight or is smaller than the lower limit value 93 thereof, the estimated value determining unit 90 determines that the estimated weight or the Kh estimated value and the Tp estimated value are not reliable. In such a case, the estimated value determining unit 90 discards an estimated value having a low reliability level and resets only the estimated value having the low reliability level.

For example, in a case where the reliability level of the estimated weight calculated by the reliability calculating unit 95 is lower than the reliability level of the Kh estimated value, the estimated weight is discarded. On the other hand, in a case where the reliability level of the Kh estimated value is lower than the reliability level of the estimated weight, the Kh estimated value and the Tp estimated value are discarded.

When all the estimated values having low reliability levels are discarded, the behavior control of the vehicle 1 is performed using a fixed value set in advance such as the fixed weight GVW instead of the discarded estimated value, or the process is returned to step ST401 so as to repeat the sequence for calculating the estimated values of the state or the characteristic of the vehicle 1 again.

According to the vehicle control device 2 of the fourth embodiment described above, the reliability levels of the estimated weight of the vehicle 1 and the Kh estimated value are calculated, and, in a case where an estimated value is determined not to be reliable in the determination of the correlation of the estimated values, an estimated value having a low reliability level is discarded. As a result, the calculation of an estimated value deviating from the actual value can be suppressed more reliably, whereby the estimation accuracy of estimated values of the state or the characteristic of the vehicle 1 can be improved.

In addition, in a case where an estimated value is determined not to be reliable in the determination of correlation of the estimated values, only an estimated value having a low reliability level is discarded, and an estimated value having a high reliability level is used for the behavior control of the vehicle 1. Accordingly, the behavior control can be performed by using only the estimated value having a high reliability level without using an estimated value having a low reliability level. As a result, more appropriate behavior control can be performed, and accordingly, the stability at the time when the vehicle 1 travels can be reliably secured.

Modified Examples

In the vehicle control device 2 according to the second embodiment, both the upper limit side and the lower limit side of the guard range are changed when estimated calculation of the stability factor Kh has been completed or has not been completed. However, the change of the guard range may be made on one of the upper limit side and the lower limit side when the estimation calculation has been completed or has not been completed. For example, it may be configured such that the guard is set in the range of the weight of the vehicle at a time when two persons get therein to the fixed weight GVW when the estimation calculation of the stability factor Kh has not been completed, and the guard is set in the range of the weight M1 or M2 to the fixed weight GVW when the estimation calculation has been completed. As above, the value to be changed when the estimation calculation has been completed or has not been completed is configured to be one of the upper limit value and the lower limit value, and accordingly, the steps of the calculation processes can be reduced, whereby the easiness of the calculation processes can be improved.

In addition, in the vehicle control device 2 according to the third and fourth embodiments, the upper limit value 92 and the lower limit value 93 of the Kh estimated value for the estimated weight are set in the correlation determination range 91, and, in a case where the Kh estimated value is above the upper limit value 92 or below the lower limit value 93, the estimated value is reset. However, the correlation determination may be performed by setting an upper limit value and a lower limit value to the estimated weight. In other words, it may be configured such that the upper limit value and the lower limit value of the estimated weight for the Kh estimated value are set in advance as the correlation determination range, and the estimated value is reset in a case where the estimated weight is above the set upper limit value or below the set lower limit value. In a case where the correlation between the estimated weight and the turning characteristic is determined, the determination may be made by using one of the weight and the turning characteristic as the reference as long as the correlation of the both sides can be determined.

Furthermore, in the vehicle control device 2 described above, in a case where the behavior control of the vehicle 1 is performed, while the behavior control has been described to be performed by controlling the output of the engine, the braking force of each vehicle wheel 5, and the like, devices used for the behavior control are not limited thereto. The form or the control method of the devices used at the time of performing the behavior control is not limited to that described above as long as the devices can perform the behavior control at a time when the vehicle 1 travels by being operated by the traveling control unit 53 with the control amount calculated by the behavior control unit 54.

In addition, in the vehicle control device 2, the configurations or the control processes used in the above-described first to fourth embodiments and the modified examples may be appropriately mixed, or a configuration or a control process other than that described above may be used. Regardless of the configuration or the control method of the vehicle control device 2, by configuring the estimated values used for the calculation of the control amount of the behavior control to be put into a predetermined range, appropriate behavior control can be performed regardless of the detection results acquired by the sensors.

REFERENCE SIGNS LIST

1 VEHICLE
2 VEHICLE CONTROL DEVICE
5 VEHICLE WHEEL
10 STEERING DEVICE
20 BRAKING DEVICE
30 BRAKE FLUID PRESSURE CONTROL DEVICE
41 VEHICLE SPEED SENSOR
42 STEERING ANGLE SENSOR
43 YAW RATE SENSOR
44 LATERAL ACCELERATION SENSOR
45 VEHICLE WHEEL SPEED SENSOR
50 ECU
52 TRAVELING STATE ACQUIRING UNIT
53 TRAVELING CONTROL UNIT
54 BEHAVIOR CONTROL UNIT
55 TRAVELING STATE CALCULATING UNIT (TRAVELING STATE ESTIMATING UNIT)
56 WEIGHT CALCULATING UNIT (WEIGHT ESTIMATING UNIT)
57 CALCULATION STATE DETERMINING UNIT
58 GUARD SETTING UNIT (UPPER AND LOWER VALUES LIMIT SETTING UNIT)
59 UPPER AND LOWER LIMIT PROCESSING UNIT
80 and 85 UPPER AND LOWER LIMIT GUARD
90 ESTIMATED VALUE DETERMINING UNIT
91 CORRELATION DETERMINATION RANGE
94 DETERMINATION RANGE
95 RELIABILITY CALCULATING UNIT

The invention claimed is:

1. A vehicle control device comprising:
a weight estimating unit configured to estimate a weight of a vehicle;
a traveling state estimating unit configured to estimate a turning characteristic of the vehicle;
an upper and lower limit values setting unit configured to both an upper limit value and a lower limit value of the turning characteristic based on the weight of the vehicle estimated by the weight estimating unit;
an upper and lower limit values changing unit configured to change at least one of the upper limit value and the lower limit value of the turning characteristic based on the weight of the vehicle estimated by the weight estimating unit;
an upper and lower limit processing unit configured to perform a process of putting the turning characteristic estimated by the traveling state estimating unit into a range of the upper and lower limit values set by the upper and lower limit values setting unit; and
a behavior control unit configured to perform behavior control of the vehicle based on the turning characteristic after the process of putting the turning characteristic into the range of the upper and lower limit values performed by the upper and lower limit processing unit.

2. The vehicle control device according to claim 1, wherein the upper and lower limit values setting unit sets the upper and lower limit values as values determined in advance in a case where the estimation of the weight of the vehicle is not completed by the weight estimating unit at the time of setting the upper and lower limit values.

3. The vehicle control device according to claim 2, wherein a value determined in advance is set to at least one of the weight of the vehicle and the turning characteristic of the vehicle in a case where the weight of the vehicle estimated by the weight estimating unit or the turning characteristic of the vehicle estimated by the traveling state estimating unit is above an upper limit value of a correlation determination range used for determining whether or not the weight of the vehicle or the turning characteristic of the vehicle is reliable, or is below a lower limit value of the correlation determination range.

4. The vehicle control device according to claim 2, wherein the traveling state estimating unit estimates the turning characteristic based on the relation between lateral acceleration of the vehicle from which components of a first predetermined frequency and a lower frequency are removed and a yaw rate deviation index value from which a second predetermined frequency or a lower frequency are removed with an index value of a deviation between a transient yaw rate of the vehicle having relation of a first-order lag with respect to a normative yaw rate of the vehicle and an actual yaw rate of the vehicle being set as the yaw rate deviation index value.

5. The vehicle control device according to claim 1, wherein a value determined in advance is set to at least one of the weight of the vehicle and the turning characteristic of the vehicle in a case where the weight of the vehicle estimated by the weight estimating unit or the turning characteristic of the vehicle estimated by the traveling state estimating unit is above an upper limit value of a correlation determination range used for determining whether or not the weight of the vehicle or the turning characteristic of the vehicle is reliable, or is below a lower limit value of the correlation determination range.

6. The vehicle control device according to claim 1, wherein the traveling state estimating unit estimates the turning characteristic based on the relation between lateral acceleration of the vehicle from which components of a first predetermined frequency and a lower frequency are removed and a yaw rate deviation index value from which a second predetermined frequency or a lower frequency are removed with an index value of a deviation between a transient yaw rate of the vehicle having relation of a first-order lag with respect to a normative yaw rate of the vehicle and an actual yaw rate of the vehicle being set as the yaw rate deviation index value.

7. A vehicle control device comprising:
a weight estimating unit configured to estimate a weight of a vehicle;
a traveling state estimating unit configured to estimate a turning characteristic of the vehicle;
an upper and lower limit values setting unit configured to both an upper limit value and a lower limit value of the weight of the vehicle based on the turning characteristic of the vehicle estimated by the traveling state estimating unit;
an upper and lower limit values changing unit configured to change at least one of the upper limit value and the lower limit value of the weight of the vehicle based on the turning characteristic of the vehicle estimated by the traveling state estimating unit;

an upper and lower limit processing unit configured to perform a process of putting the weight of the vehicle estimated by the weight estimating unit into a range of the upper and lower limit values set by the upper and lower limit values setting unit; and a behavior control unit configured to perform behavior control of the vehicle based on a weight of the vehicle after the process of putting the weight of the vehicle into the range of the upper and lower limit values performed by the upper and lower limit processing unit.

8. The vehicle control device according to claim 7, wherein a value determined in advance is set to at least one of the weight of the vehicle and the turning characteristic of the vehicle in a case where the weight of the vehicle estimated by the weight estimating unit or the turning characteristic of the vehicle estimated by the traveling state estimating unit is above an upper limit value of a correlation determination range used for determining whether or not the weight of the vehicle or the turning characteristic of the vehicle is reliable, or is below a lower limit value of the correlation determination range.

9. The vehicle control device according to claim 8, wherein the traveling state estimating unit estimates the turning characteristic based on the relation between lateral acceleration of the vehicle from which components of a first predetermined frequency and a lower frequency are removed and a yaw rate deviation index value from which a second predetermined frequency or a lower frequency are removed with an index value of a deviation between a transient yaw rate of the vehicle having relation of a first-order lag with respect to a normative yaw rate of the vehicle and an actual yaw rate of the vehicle being set as the yaw rate deviation index value.

10. The vehicle control device according to claim 7, wherein
the traveling state estimating unit estimates the turning characteristic based on the relation between lateral acceleration of the vehicle from which components of a first predetermined frequency and a lower frequency are removed and a yaw rate deviation index value from which a second predetermined frequency or a lower frequency are removed with an index value of a deviation between a transient yaw rate of the vehicle having relation of a first-order lag with respect to a normative yaw rate of the vehicle and an actual yaw rate of the vehicle being set as the yaw rate deviation index value.

* * * * *